United States Patent
Kuwano

(10) Patent No.: US 8,873,107 B2
(45) Date of Patent: Oct. 28, 2014

(54) IMAGE PROCESSING APPARATUS, MEDIUM, AND METHOD GENERATING FOREGROUND IMAGE EXPRESSING COLOR IN SPECIFIC REGION BASED ON INPUT IMAGE AND DETERMINED IMAGE ATTRIBUTES

(71) Applicant: Oki Data Corporation, Tokyo (JP)

(72) Inventor: Tetsuaki Kuwano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/037,631

(22) Filed: Sep. 26, 2013

(65) Prior Publication Data

US 2014/0085680 A1 Mar. 27, 2014

(30) Foreign Application Priority Data

Sep. 27, 2012 (JP) ................ 2012-214699

(51) Int. Cl.
| | | |
|---|---|---|
| H04N 1/403 | (2006.01) | |
| H04N 1/41 | (2006.01) | |
| H04N 1/56 | (2006.01) | |
| H04N 1/64 | (2006.01) | |
| G06T 9/00 | (2006.01) | |
| H04N 1/40 | (2006.01) | |
| H04N 1/46 | (2006.01) | |

(52) U.S. Cl.
CPC .............. *H04N 1/40062* (2013.01); *H04N 1/46* (2013.01)
USPC ...... 358/2.1; 358/1.18; 358/539; 358/426.04; 358/462; 382/164; 382/166; 382/173; 382/232; 382/302

(58) Field of Classification Search
None
See application file for complete search history.

(56) References Cited

U.S. PATENT DOCUMENTS

| | | | | |
|---|---|---|---|---|
| 7,283,674 B2* | 10/2007 | Bai et al. | .............. | 382/232 |
| 7,356,183 B2* | 4/2008 | Curry et al. | .............. | 382/173 |
| 7,376,272 B2* | 5/2008 | Fan et al. | .............. | 382/173 |
| 7,386,166 B2* | 6/2008 | Curry et al. | .............. | 382/173 |
| 7,456,982 B2* | 11/2008 | Curry et al. | .............. | 358/1.9 |
| 7,639,880 B2* | 12/2009 | Hasegawa et al. | .............. | 358/1.9 |
| 8,131,092 B2* | 3/2012 | Usui et al. | .............. | 382/232 |
| 8,155,437 B2* | 4/2012 | Gross et al. | .............. | 382/166 |
| 8,229,238 B2* | 7/2012 | Matsumoto | .............. | 382/176 |
| 8,335,379 B2* | 12/2012 | Malik | .............. | 382/173 |
| 8,396,298 B2* | 3/2013 | Dai | .............. | 382/199 |
| 8,649,616 B2* | 2/2014 | Sadasue et al. | .............. | 382/232 |

FOREIGN PATENT DOCUMENTS

JP 11-177977 A 7/1999

* cited by examiner

*Primary Examiner* — Scott A Rogers

(74) *Attorney, Agent, or Firm* — Kubotera & Associates, LLC

(57) ABSTRACT

An image processing apparatus includes a first attribute image generation unit; a second attribute image generation unit; and a foreground image generation unit. The first attribute image generation unit is configured to determine a first attribute value from an input image to generate a first attribute image. The second attribute image generation unit is configured to determine a second attribute value from the input image to generate a second attribute image. The foreground image generation unit is configured to generate a foreground image expressing color information in the specific region according to the input image, the first attribute image, and the second attribute image. Further, the foreground image generation unit is configured to switch a method of determining a pixel value of a target pixel of the foreground image according to contents of the first attribute image and the second attribute image in a reference region.

13 Claims, 16 Drawing Sheets

IMAGE PROCESSING APPARATUS, MEDIUM, AND METHOD GENERATING FOREGROUND IMAGE EXPRESSING COLOR IN SPECIFIC REGION BASED ON INPUT IMAGE AND DETERMINED IMAGE ATTRIBUTES

BACKGROUND OF THE INVENTION AND RELATED ART STATEMENT

The present invention relates to an image processing apparatus, a medium, and a method of processing image data. More specifically, the present invention relates to an image processing apparatus configured to execute a process of creating a PDF (Portable Document Format) file from image data using MRC (Mixed Raster Content), a non-transitory computer readable medium storing a program causing a computer to execute the process, and a method of processing image data. A non-transitory computer readable medium includes a hard drive, a compact disc, a flash memory, a volatile memory, and the like, but does not include a transitory signal per se.

A conventional image processing apparatus such as an MFP (Multi Function Product) has been universally available. Such a conventional image processing apparatus may be provided with a function of converting image data (scan data) obtained through reading a text and the like to a PDF (Portable Document Format) file, so that the conventional image processing apparatus outputs data of the PDF file.

In general, information quantity of the image data tends to become larger without compression. Accordingly, when the PDF file is created, the image data are compressed to reduce the information quantity of the image data, thereby alleviating load on the communication network or requirement to a recording medium. Recently, PDF has been widely used and standardized (ISO 32000-1), so that the format has been widely available. As a result, it has been generally possible to express an image with a multiple layers structure.

Patent Reference has disclosed a conventional image expression method using the multiple layers structure. In the conventional image expression method disclosed in Patent Reference, it is possible to efficiently compress a document image generally called MRC (Mixed Raster Content), in which a natural image and a text image coexist, while maintaining image quality.

Patent Reference: Japanese Patent Publication No. 11-177977

Currently, the JPEG method has been widely used as a compression method of an image. The JPEG method is a non-reversible compression method utilizing continuity of an image, and it is possible to reduce the information quantity without excessively damaging image quality of an appearance of a natural image. For this reason, the JPEG method has been frequently used for compressing an image constituting a layer of MRC. However, when the JPEG method is adopted to compress a text color image with an abrupt color change and the like, it is difficult to obtain good image quality and high compression efficiency due to the nature of the JPEG method.

To this end, it has been required to provide an image processing apparatus, a non-transitory computer readable medium storing a program causing a computer to execute a process, and a method of processing image data, which is capable of obtaining a decoded image with good image quality, even when the image data of the image expressed with the multi layer structure (for example, the image expressed with MRC) are processed (compressed, encoded, and the like) with the non-reversible method (for example, the JPEG method).

An object of the present invention is to provide an image processing apparatus, a medium, and a method of processing an image capable of maintaining good image quality.

Further objects and advantages of the invention will be apparent from the following description of the invention.

SUMMARY OF THE INVENTION

In order to attain the objects described above, according to a first aspect of the present invention, an image processing apparatus includes a first attribute image generation unit; a second attribute image generation unit; and a foreground image generation unit.

According to the first aspect of the present invention, the first attribute image generation unit is configured to determine a first attribute value with regard to each pixel from an input image to generate a first attribute image. The first attribute value is expressed with a first value indicating that a pixel is a specific pixel in a specific region constituting a text or a line, or with a second value indicating that a pixel is not the specific pixel.

According to the first aspect of the present invention, the second attribute image generation unit is configured to determine a second attribute value with regard to each pixel from the input image to generate a second attribute image. The second attribute value is expressed with a first value indicating that a pixel is in a chromatic color, or with a second value indicating that a pixel is in an achromatic color.

According to the first aspect of the present invention, the foreground image generation unit is configured to generate a foreground image expressing color information in the specific region according to the input image, the first attribute image, and the second attribute image. Further, the foreground image generation unit is configured to switch a method of determining a pixel value of a target pixel of the foreground image according to contents of the first attribute image and the second attribute image in a reference region including the target pixel associated with determining the pixel value when the pixel value of each pixel of the foreground image is determined.

According to a second aspect of the present invention, a non-transitory computer readable medium stores an image processing program that causes a computer to execute functional units including a first attribute image generation unit; a second attribute image generation unit; and a foreground image generation unit.

According to the second aspect of the present invention, the first attribute image generation unit is configured to determine a first attribute value with regard to each pixel from an input image to generate a first attribute image. The first attribute value is expressed with a first value indicating that a pixel is a specific pixel in a specific region constituting a text or a line, or with a second value indicating that a pixel is not the specific pixel.

According to the second aspect of the present invention, the second attribute image generation unit is configured to determine a second attribute value with regard to each pixel from the input image to generate a second attribute image. The second attribute value is expressed with a first value indicating that a pixel is in a chromatic color, or with a second value indicating that a pixel is in an achromatic color.

According to the second aspect of the present invention, the foreground image generation unit is configured to generate a foreground image expressing color information in the specific region according to the input image, the first attribute image, and the second attribute image. Further, the foreground image generation unit is configured to switch a method of determining a pixel value of a target pixel of the foreground image according to contents of the first attribute image and the second attribute image in a reference region including the target pixel associated with determining the pixel value when the pixel value of each pixel of the foreground image is determined.

According to a third aspect of the present invention, a method of processing an image includes a first attribute image generation step; a second attribute image generation step; and a foreground image generation step.

According to the third aspect of the present invention, the first attribute image generation step is performed to determine a first attribute value with regard to each pixel from an input image to generate a first attribute image. The first attribute value is expressed with a first value indicating that a pixel is a specific pixel in a specific region constituting a text or a line, or with a second value indicating that a pixel is not the specific pixel.

According to the third aspect of the present invention, the second attribute image generation step is performed to determine a second attribute value with regard to each pixel from the input image to generate a second attribute image. The second attribute value is expressed with a first value indicating that a pixel is in a chromatic color, or with a second value indicating that a pixel is in an achromatic color.

According to the third aspect of the present invention, the foreground image generation step is performed to generate a foreground image expressing color information in the specific region according to the input image, the first attribute image, and the second attribute image. Further, the foreground image generation unit is configured to switch a method of determining a pixel value of a target pixel of the foreground image according to contents of the first attribute image and the second attribute image in a reference region including the target pixel associated with determining the pixel value when the pixel value of each pixel of the foreground image is determined.

According to the present invention, it is possible to obtain a restored image with good image quality even when image data of an image expressed with the multi layer structure are processed with the non-reversible method.

DETAILED DESCRIPTION OF PREFERRED EMBODIMENTS

Hereunder, embodiments of the present invention will be explained with reference to the accompanying drawings. It should be noted that the present invention is not limited to the following description, and the embodiments can be modified within a scope of the present invention.

First Embodiment

Figure 1:
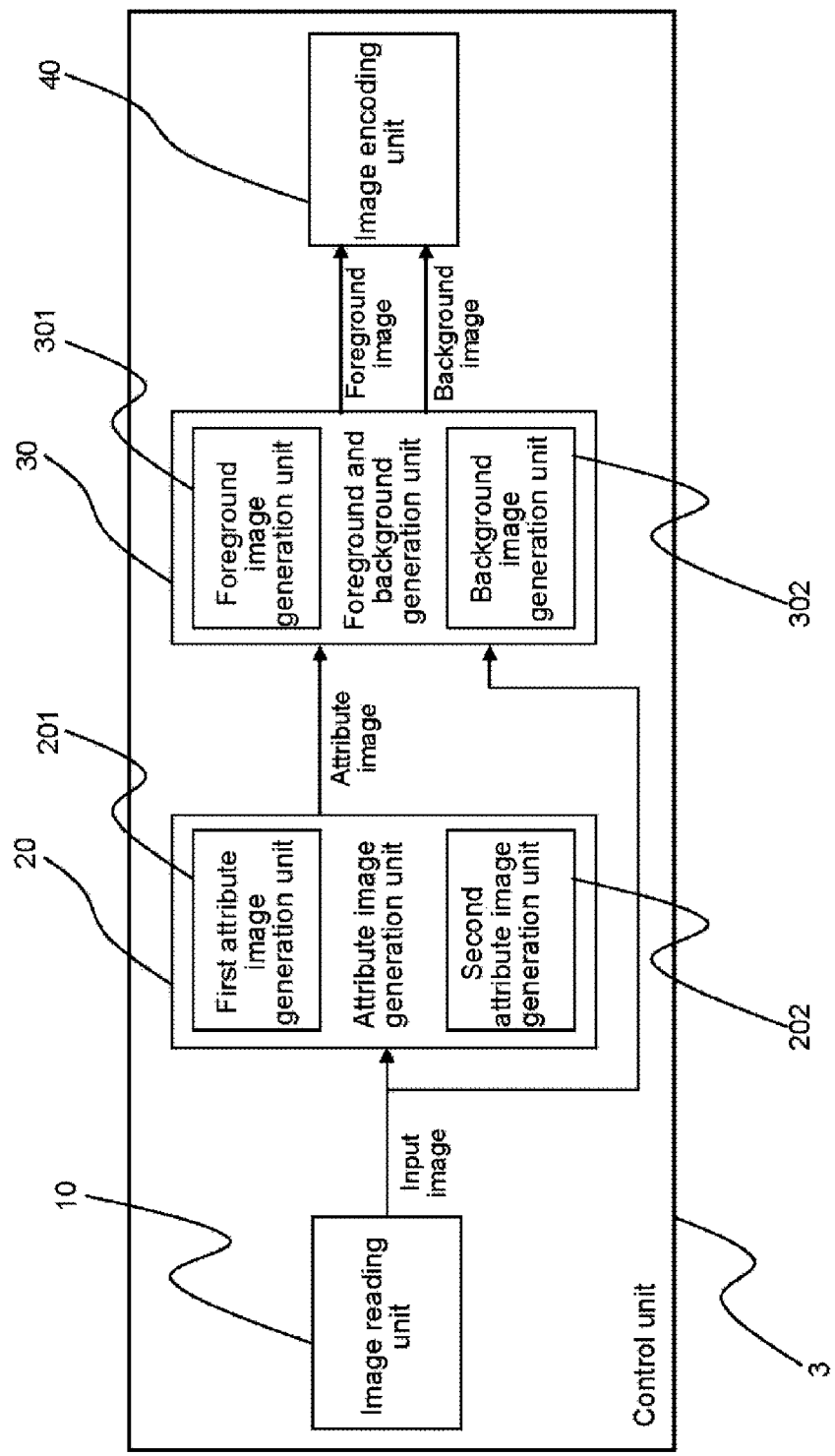
FIG. 1 is a block diagram showing a functional configuration of a control unit of an image processing apparatus according to a first embodiment of the present invention.
Figure 2:
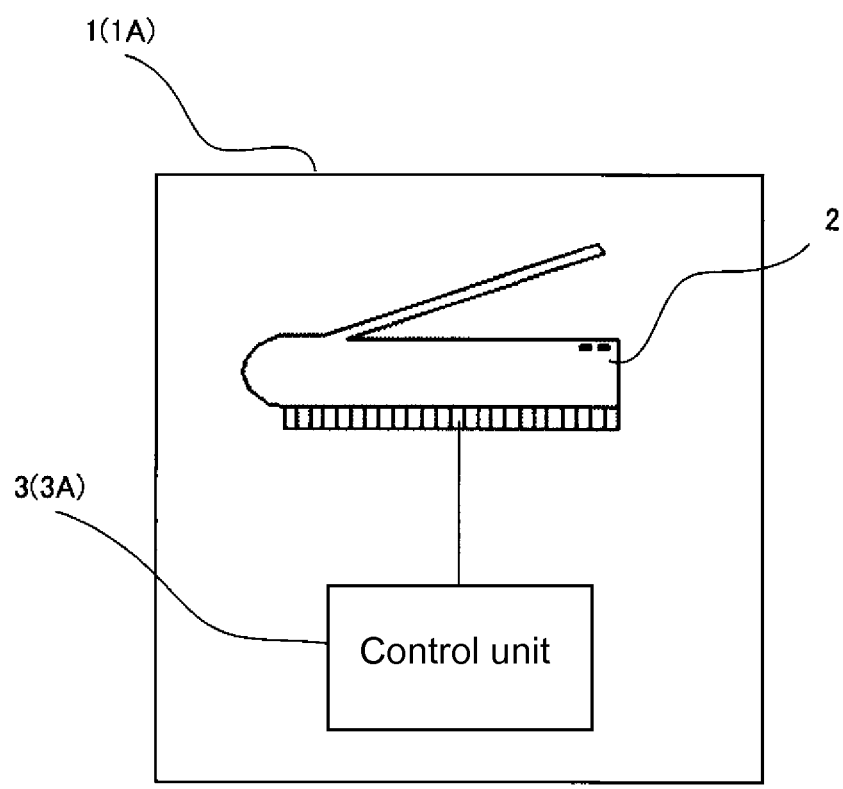
FIG. 2 is a block diagram showing an entire configuration of the image processing apparatus according to the first embodiment of the present invention.

A first embodiment of the present invention will be explained. FIG. 1 is a block diagram showing a functional configuration of a control unit 3 of an image processing apparatus 1 according to the first embodiment of the present invention. FIG. 2 is a block diagram showing an entire configuration of the image processing apparatus 1 according to the first embodiment of the present invention. It should be noted that the reference numerals in parentheses in FIG. 2 will be referred in the description of the second embodiment.

Figure 3:
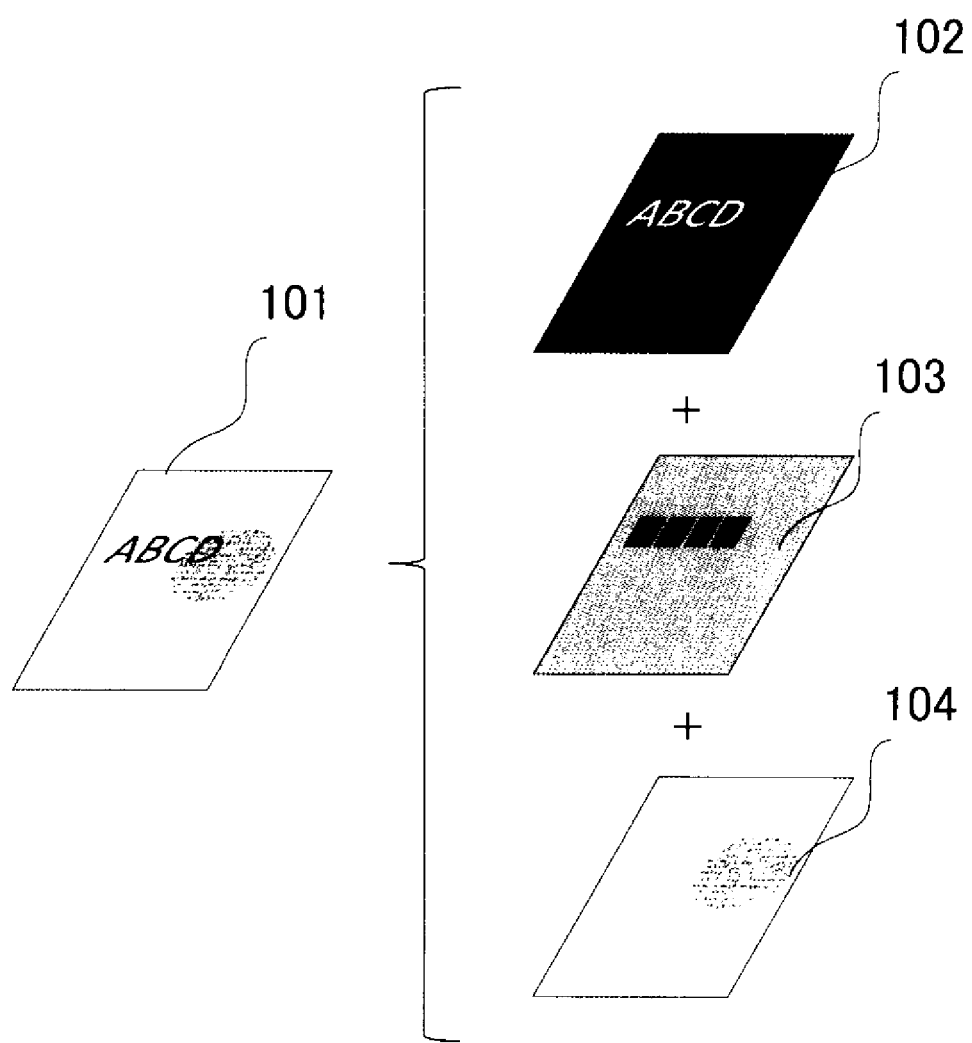
FIG. 3 is a schematic view showing a layered structure of an MRC (Mixed Raster Content) image to be processed with the image processing apparatus according to the first embodiment of the present invention.

FIG. 3 is a schematic view showing a layered structure of an MRC (Mixed Raster Content) image 101 to be processed with the image processing apparatus 1 according to the first embodiment of the present invention.

As shown in FIG. 3, the MRC image 101 is formed of three layers (three types) of images including a foreground mask image 102 representing information such as a region of a text and a line (referred to as a specific region); a foreground image 103 representing color information of the text and the line (a pixel value); and a background image 104 representing a color of a natural image and a base.

In the embodiment, in the MRC image 101, an input image is binarized to generate the foreground mask image 102 using a specific method. An example of the method of generating the foreground mask image 102 may include a method, in which a pixel having a brightness smaller than that of a surrounding pixel is extracted as a text region through an adaptive threshold process in consideration of a text in black (referred to as a black text) or a line on a white base, or a method of applying a threshold process uniformly to a brightness of an entire image.

Further, an example of the method of generating the foreground mask image 102 may include a method, in which the input image is binarized with respect to chromaticness similar to brightness in consideration of a text in a chromatic color (referred to as a color text) or a line on a white base, so that a binary result of the chromaticness is combined with a binary result of the brightness. Further, for example, an encoding method suitable for a binary image such as MMR (Modified Modified READ) may be applied to the image processing apparatus 1. It should be noted that a code length tends to be longer when an image contains a large number of noises. Accordingly, it is preferred that the method of generating the foreground mask image 102 is a method with a small number of noises in addition to being capable of obtaining the specific region.

In the embodiment, the image processing apparatus 1 is configured to perform a process of generating the MRC image 101 shown in FIG. 3 according to the input image that is captured through scanning an original document and the like. As shown in FIG. 2, the image processing apparatus 1 includes a scanner 2 and the control unit 3 as hardware.

In the embodiment, the scanner 2 is a device configured to scan the original document set by a user according to a control of the control unit 3 and an operation of the user. The scanner 2 may include a scanning device capable of connecting to an ordinary personal computer (PC), a work station, and the like.

In the embodiment, the control unit 3 is configured to process input image data based on a reading signal supplied from the scanner 2, and to generate the MRC image 101. It should be noted that the image processing apparatus 1 includes the two separate units, i.e., the scanner 2 and the control unit 3, as hardware, and may be configured to be as one single integrated apparatus. For example, the image processing apparatus 1 may be configured to be an MFP (Multi Function Printer) having the functions of the scanner 2 and the control unit 3.

As shown in FIG. 1, the control unit 3 includes an image reading unit 10; an attribute image generation unit 20; a foreground and background generation unit 30; and an image encoding unit 40. The control unit 3 may be formed of a part or a combination of a circuit that processes a signal. Alternatively, the control unit 3 may be realized with software operated by ordinary hardware (a computer having a processor). For example, the control unit 3 may be realized through installing an image processing program in a computer such as a personal computer (PC), a work station, and the like.

In the embodiment, the image reading unit 10 is configured to generate the input image data (for example, image data with a bitmap format) according to the reading signal supplied from the scanner 2.

Further, in the control unit 3, the attribute image generation unit 20 and the foreground and background generation unit 30 are configured to generate the foreground mask image 102, the foreground image 103, and the background image 104 according to the input image. Further, the image encoding unit 40 is configured to encode the foreground image 103 and the background image 104 with a non-reversible method (the JPEG method in the embodiment), thereby generating the MRC image 101.

In the embodiment, it should be noted that, in the control unit 3, the attribute image generation unit 20 functions as a first attribute image generation unit and a second attribute image generation unit. Further, in the control unit 3, the foreground and background generation unit 30 functions as a foreground image generation unit and a background image generation unit. Still further, in the control unit 3, the image encoding unit 40 functions as an image encoding unit.

When an image is processed with the JPEG method, an information quantity after compression is expressed as an average information quantity H(X) with respect to an output code X with the following equation (1):

$$H(X) = \sum_{x_i \in X} P(x_i) \log_2 \frac{1}{P(x_i)} \quad (1)$$

where P represents a probability of occurrence of each element constituting a code.

In the equation (1), the average information quantity H(X) decreases when the number of the elements constituting a code decreases, or a deviation of the probability of occurrence of each element becomes larger. In other words, as the image to be encoded becomes closer to a uniform state, the average information quantity H(X) decreases. In order to obtain good image quality and high compression efficiency, it is necessary to make an image closer to a uniform state while the foreground image 103 and the background image 104 maintain effective image quality as a composite result of MRC (a decoded image).

Figure 4:
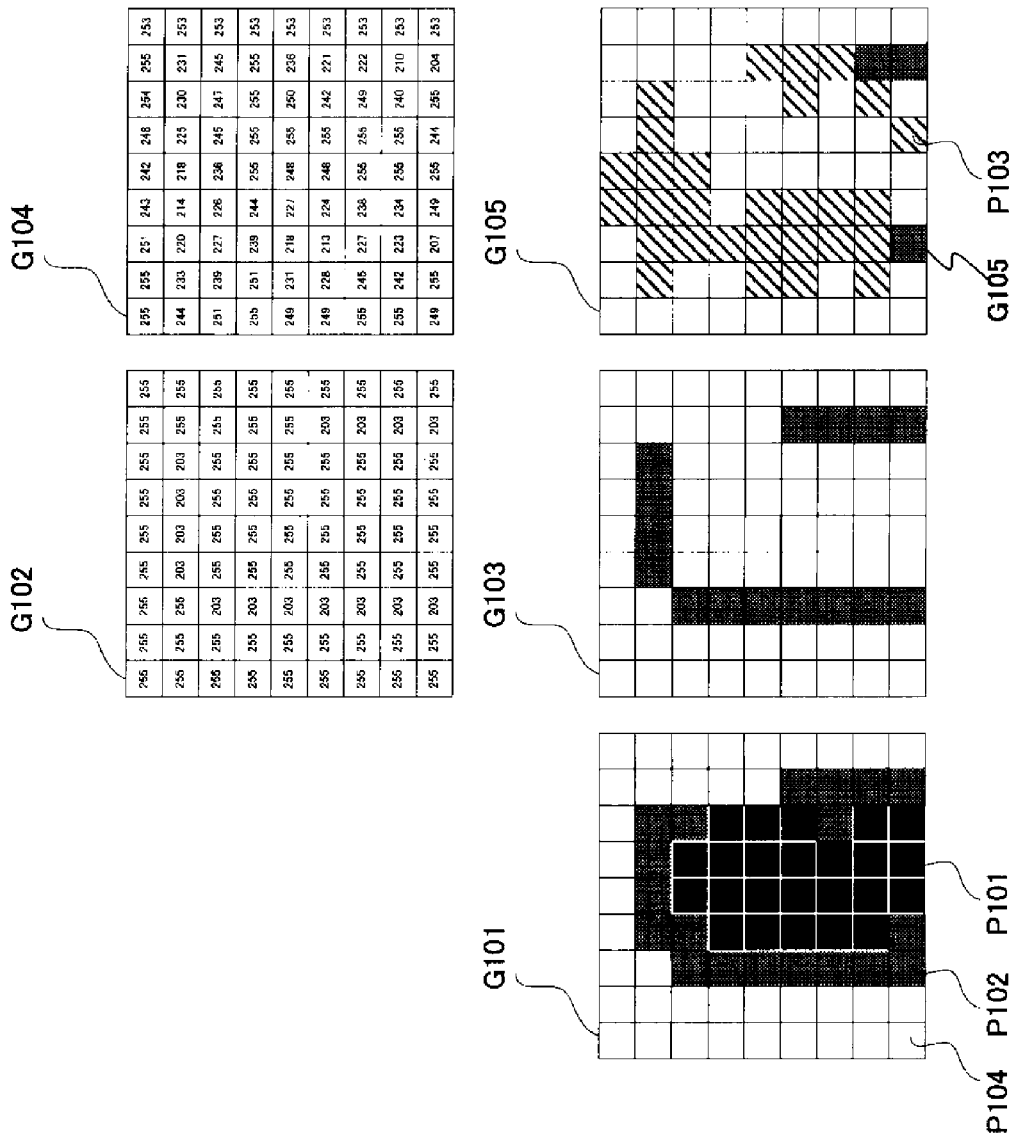
FIG. 4 is a schematic view showing a deteriorated example of an MRC (Mixed Raster Content) image processed with a conventional image processing apparatus.

An example of deteriorated decoded image will be explained with reference to FIG. 4 in the case that the images constituting the layers of the MRC image 101 are compressed with the JPEG method (the non-reversible method). FIG. 4 is a schematic view showing the deteriorated example of the MRC (Mixed Raster Content) image processed with a conventional image processing apparatus.

As shown in FIG. 4, as the example of the deteriorated decoded image, images G101 to G105 (images represented with 9×9 pixels) are shown. In the images G102 and G104 in FIG. 4, a pixel value (the brightness) of each pixel is shown. In the images G101, G103, and G105 in FIG. 4, the brightness of each pixel is represented with a pattern in a frame of each pixel. For example, in FIG. 4, a pixel with a solid frame such as a pixel P101 has the lowest brightness, and a pixel with an empty frame such as a pixel P104 has the highest brightness. Further, a pattern assigned to a pixel P103 has a higher brightness than that of a pattern assigned to a pixel P102.

As an example, it is supposed that the background image G103 of MRC is obtained from the image G101 expressing a part of a letter. The image G102 represents the pixel values of the background image G103. In order to reduce the information quantity, the background image G103 is encoded non-reversibly with the JPEG method, and then is decoded to obtain the image G105. The image G104 represents the pixel values of the image G105.

As shown in FIG. 4, in the image G105, an edge region (a region constituting an edge portion of the letter or the line) affects a surrounding thereof, thereby deteriorating the image quality. It should be noted that the image quality of the foreground image can be similarly deteriorated due to the effect in the pixel values of the edge region.

In general, in the case of a text image and the like that is supposed to be compressed with MRC, it is more important for a person to obtain clear visibility of a text rather than good reproduction of a fine gradation surrounding the text. To this end, in the foreground image and the background image, rather than simply arranging the pixel values of the input image at appropriate positions, it is necessary to express the text and the base color even in an image having a relatively uniform state in terms of compression and the image quality.

When the original document contains the text and the natural image, it is difficult to reduce the information quantity to a large extent with the JPEG method while maintaining the good image quality. In this case, MRC is used to compress the image data of the original document for creating the PDF file. When there is a large difference in the brightness of the text in the background and the foreground, it is easy for a person to recognize the text. However, when MRC is used for the image processing, it is preferred to minimize a visual difference between the input image and the decoded image. Accordingly, as an example of the image processing based on MRC, with respect to the background image, there has been a method for determining a pixel value of a target pixel, in which the pixel value of the pixel with a high brightness is referred among the pixels of the background region surrounding the target pixel in the input image.

Further, as an example of the image processing based on MRC, with respect to the foreground image, there has been a method for determining the pixel value of the target pixel, in which the pixel value of the pixel with a low brightness is referred among the pixels of the foreground region surrounding the target pixel in the input image. In the image processing based on MRC described above, it is possible to obtain the decoded image with the good image quality in the region of the black text (the text region in the achromatic color). However, it is difficult to obtain the decoded image with sufficient brightness in the region of the color text (the text region in the chromatic color). Accordingly, as compared with the input image, the decoded image appears dull to human eyes.

To this end, in the embodiment of the present invention, with respect to the foreground region (the region not masked with the foreground mask image 102), the control unit 3 (the foreground and background generation unit 30) is configured to switch the method for determining the pixel value to be applied to the corresponding region of the foreground image 103 between the case in the chromatic color and the case in the achromatic color.

More specifically, when the control unit 3 determines the pixel value associated with the specific region in the achromatic color (for example, the region of the black text) with respect to the foreground image 103, the control unit 3 uses the method described above using the brightness to determine the pixel value. When the control unit 3 determines the pixel value associated with the specific region in the chromatic color (for example, the region of the color text) with respect to the foreground image 103, the control unit 3 uses the method, in which the pixel with a high chromaticness is referred among the pixels surrounding the target pixel (the pixels in the foreground region) in the input image, to determine the pixel value. It should be noted that, when the control unit 3 determines the pixel value associated with the specific region in the chromatic color with respect to the foreground image 103, the control unit 3 may be configured to use the method described above for determining the target pixel using the brightness to determine the pixel value. Then, the lowered brightness is compensated according to the chromaticness (the chromaticness of the pixel in the input image).

When the background image 104 is generated, the control unit 3 may be configured to generate the background image 104 using the conventional method. In the embodiment, it is supposed that the control unit 3 generates the background image 104 using the method using the information of the chromaticness per pixel in the input image similar to the generation of the foreground image 103.

An operation of the attribute image generation unit 20 will be explained next. In the embodiment, the attribute image generation unit 20 is configured to generate the image indicating the specific region in the input image (referred to as a first attribute image) and the image indicating the region in the chromatic color (or the achromatic color) as color information in the input image (referred to as a second attribute image). Further, the attribute image generation unit 20 includes a first attribute image generation unit 201 as a first attribute image generation portion and a second attribute image generation unit 202 as a second attribute image generation portion.

When the first attribute image generation unit 201 of the attribute image generation unit 20 generates the first attribute image, the first attribute image generation unit 201 determines whether a pixel belongs to the specific region per pixel of the input image, so that the first attribute image generation unit 201 determines the pixel value in the first attribute image (referred to as a first attribute value). More specifically, when the pixel belongs to the specific region, the first attribute image generation unit 201 assigns "1" to the first attribute value. When the pixel does not belong to the specific region, the first attribute image generation unit 201 assigns "0" to the first attribute value. It should be noted that the first attribute image generated with the attribute image generation unit 20 corresponds to the foreground mask image 102 constituting the MRC image 101.

When the second attribute image generation unit 202 of the attribute image generation unit 20 generates the second attribute image, the second attribute image generation unit 202 determines whether a pixel is in the chromatic color or the achromatic color per pixel of the input image, so that the second attribute image generation unit 202 determines the pixel value in the second attribute image (referred to as a second attribute value). More specifically, when the pixel is in the chromatic color, the second attribute image generation unit 202 assigns "1" to the second attribute value. When the pixel is in the achromatic color, the second attribute image generation unit 202 assigns "0" to the second attribute value.

The first attribute image generated with the first attribute image generation unit 201 will be explained next. In the following description, it is supposed that the base color (for example, a sheet color or a background color of the original document) is white in the specific region in the input image (the test region or the line region). In other words, in the input image, it is supposed that the specific region has the brightness lower than that of the pixels surrounding the specific region.

In the embodiment, basically, the first attribute image generation unit 201 is configured to set "1" to the first attribute value when the brightness is equal to or less than a threshold value Th1. Further, even when the pixel has the brightness greater than the threshold value Th1, the first attribute image generation unit 201 is configured to set "1" to the first attribute value when the pixel has the brightness equal to or less than a threshold value Th2, which is determined by an average value of the brightness of the pixels surrounding the pixel.

Further, when only the brightness is referred, it is difficult to extract the text in yellow. Accordingly, in the embodiment, the first attribute image generation unit 201 is configured to refer to a Bb component in the YCbCr color space expression of the pixel value, thereby determining the first attribute value of the pixel. More specifically, even when the pixel has the brightness greater than the threshold value Th2, the first attribute image generation unit 201 is configured to determine the color of the pixel to be yellow when the Cb component of the pixel (the Cb component in the YCbCr color space expression) is less than a threshold value Th3. Further, when it is determined that the color of the pixel is yellow, the first attribute image generation unit 201 is configured to determine the color of the pixel to be yellow (since the colorfulness of the pixel is stronger than that of the surrounding pixels) when the Cb component of the pixel is less than a threshold value Th4, which is determined by an average value of the Cb components of the pixels surrounding the pixel, so that the first attribute image generation unit 201 determines the first attribute value to be "1".

It should be noted that the threshold values Th1 to Th4 are not specifically limited. In the embodiment, the threshold values Th1 to Th4 are determined with the following equations (2) to (4).

$$Th1=120 \tag{2}$$

$$Th2=\text{the average value of the brightness of the surrounding pixels}(n \times n)-10 \tag{3}$$

$$Th3=108 \tag{4}$$

$$Th4=\text{the average value of the Cb components of the surrounding pixels }(n \times n)-17 \tag{4}$$

In the equations (2) to (4) described above, the surrounding pixels (n×n) represent the pixels in the number of n×n with the pixel at the center thereof. In the embodiment, n is equal to 9. Further, the brightness of each pixel is represented with a number between 0 and 255, in which a larger number indicates a color with a higher brightness (a brighter color). Further, the value of the Cb component of each pixel is represented with a number between 0 and 255. Through the process described above, the first attribute image generation unit 201 determines the first attribute value of each pixel, and generates the first attribute image as the foreground mask image 102.

The second attribute image generated with the second attribute image generation unit 202 of the attribute image generation unit 20 will be explained next. In the embodiment, basically, the second attribute image generation unit 202 is configured to determine that the pixel is in the chromatic color and set "1" to the second attribute value when the chromaticness of the pixel is equal to or greater than a threshold value. Further, the second attribute image generation unit 202 is configured to determine that the pixel is in the achromatic color and set "0" to the second attribute value when the chromaticness of the pixel is less than a threshold value. It should be noted that the second attribute image generation unit 202 uses a plurality of threshold values for determining the second attribute value, and is configured to select one of the threshold values to be used per pixel.

More specifically, when the pixel is an edge pixel constituting the edge region of the text, the second attribute image generation unit 202 uses a threshold value Th6 to determine the second attribute value. When the pixel is not the edge pixel constituting the edge region of the text, the second attribute image generation unit 202 uses a threshold value Th5 to determine the second attribute value. The edge pixel tends to be mixed with the base color (for example, the sheet color of the original document), so that the chromaticness of the edge pixel tends to decrease. Accordingly, it is preferred that the threshold value Th6 to be used for the edge pixel is smaller than the threshold value Th5 to be used for the non-edge pixel (Th6<Th5). When the threshold value Th6 is set to be a value smaller than the threshold value Th5, the second attribute image generation unit 202 is capable of determining whether the edge pixel with the smaller chromaticness is in the chromatic color.

In the embodiment, the chromaticness corresponds to strength of the colorfulness (the chromaticness S) in the YCbCr color space, and can be expressed with the following equation (5). In the equation (5), Cd and Cr are represented with a number between 0 and 255. Further, the threshold values Th5 and Th6 are expressed with the following equations (6) and (7):

$$S=(Cd-128)^2+(Cr-128)^2 \tag{5}$$

$$Th5=500 \tag{6}$$

$$Th6=600 \tag{7}$$

In the embodiment, through the process described above, the second attribute image generation unit 202 determines the second attribute value with respect to each pixel, and generates the second attribute image. Then, the attribute image generation unit 20 is configured to supply information (referred to as foreground region information) including the first attribute image and the second attribute image to the foreground and background generation unit 30.

In the embodiment, the foreground and background generation unit 30 is configured to generate the foreground image 103 and the background image 104 using the foreground region information. Further, the foreground and background generation unit 30 includes a foreground image generation unit 301 as a foreground image generation portion and a background image generation unit 302 as a background image generation portion.

Figure 5:
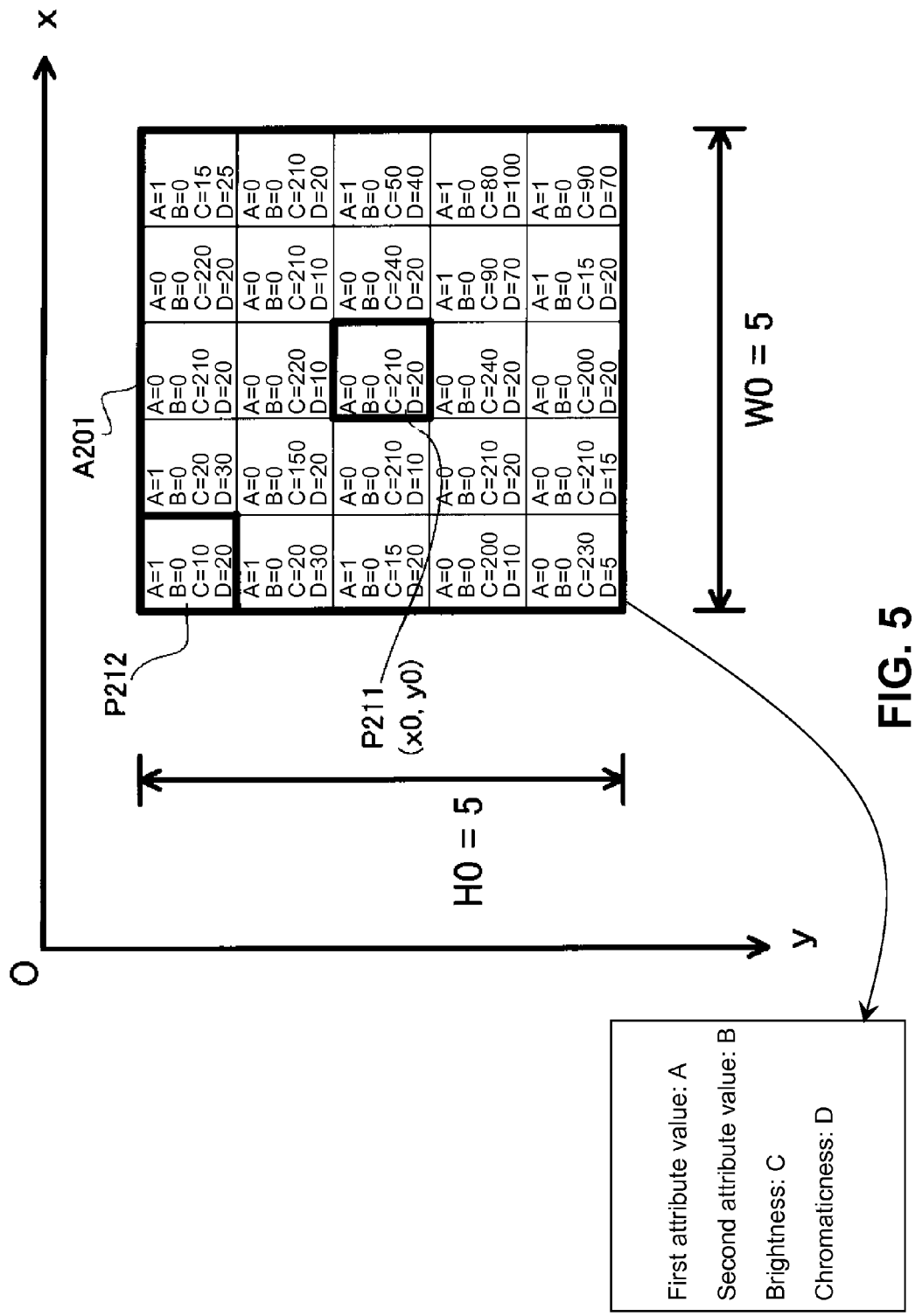
FIG. 5 is a schematic chart No. 1 showing an operation of a foreground and background generation unit of the image processing apparatus for determining a pixel value of a foreground image according to the first embodiment of the present invention.
Figure 6:
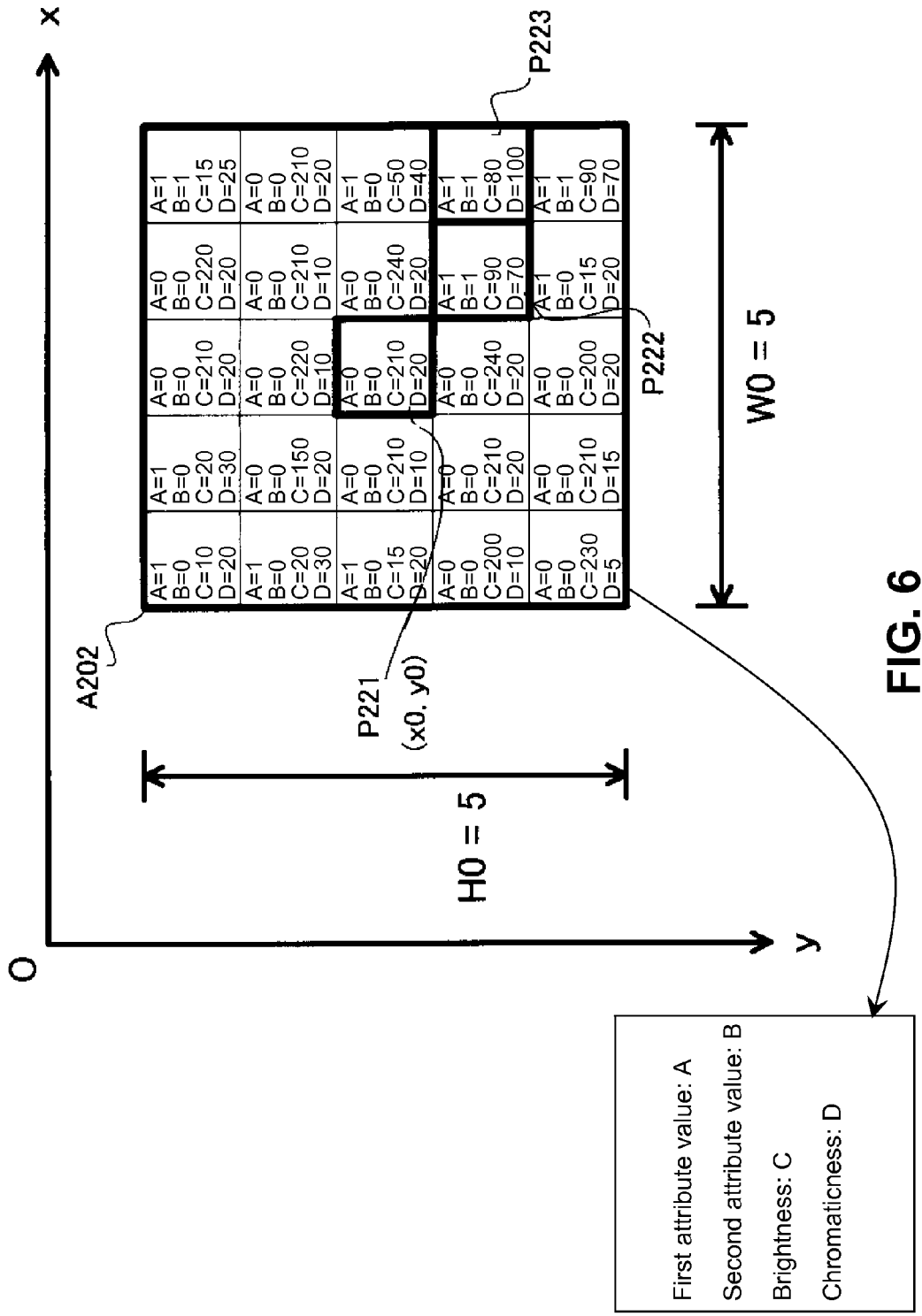
FIG. 6 is a schematic chart No. 2 showing the operation of the foreground and background generation unit of the image processing apparatus for determining the pixel value of the foreground image according to the first embodiment of the present invention.

An operation of the foreground image generation unit 301 of the foreground and background generation unit 30, in which the foreground image generation unit 301 generates the foreground image 103 using the foreground region information, will be explained next with reference to FIGS. 5 and 6. FIG. 5 is a schematic chart No. 1 showing the operation of the foreground and background generation unit 30 of the image processing apparatus 1 for determining the pixel value of the foreground image 103 according to the first embodiment of the present invention. FIG. 6 is a schematic chart No. 2 showing the operation of the foreground and background generation unit 30 of the image processing apparatus 1 for determining the pixel value of the foreground image 103 according to the first embodiment of the present invention.

FIGS. 5 and 6 show examples of the operation of the foreground image generation unit 301 in determining the pixel value of a specific pixel (referred to as a target pixel) on the foreground image 103. In FIGS. 5 and 6, a pixel at the left upper corner of the image is defined as an original point, and an X axis is defined in the horizontal direction and a Y axis is defined in the vertical direction. Further, in FIGS. 5 and 6, the first attribute value, the second attribute value, the brightness, and the chromaticness are described in a rectangular frame corresponding to each pixel. Further, in FIGS. 5 and 6, the target pixels P211 and P221 are located at a coordinate (x0, y0).

As shown in FIG. 5, a reference region A201 is defined as a region surrounding the target pixel P211 at the center and having a vertical length H0 and a horizontal length W0 (5×5 pixels). In the reference region A201, there is no pixel having the second attribute value equal to "1". Accordingly, in the example shown in FIG. 5, the foreground image generation unit 301 refers to a pixel P212 having the first attribute value equal to "1" and the lowest brightness in the reference region A201, so that the foreground image generation unit 301 determines the pixel value of the target pixel P211 in the foreground image 103.

As shown in FIG. 6, a reference region A202 is similarly defined as a region surrounding the target pixel P222 at the center and having the vertical length H0 and the horizontal length W0 (5×5 pixels). In the reference region A202, a pixel P222 at the nearest location to the target pixel 221 has the first attribute value equal to "1" and the second attribute value equal to "1". Accordingly, in the example shown in FIG. 6, the foreground image generation unit 301 refers to a pixel P223 having the first attribute value equal to "1" and the highest chromaticness in the reference region A202, so that the foreground image generation unit 301 determines the pixel value of the target pixel P221 in the foreground image 103. As described above, in the examples shown in FIGS. 5 and 6, the reference regions A201 and A202 are defined to have the vertical length H0 and the horizontal length W0 (5×5 pixels) when the foreground image generation unit 301 determines the pixel value of the foreground image 103. It should be noted that the size of the reference regions A201 and A202 is arbitrary.

In the embodiment, the background image generation unit 302 is configured to generate the background image 104 using the foreground information. That is, the background image generation unit 302 uses a method of generating the background image 104, and the method is not limited to specific one. In the embodiment, the background image generation unit 302 determines the pixel value of the target pixel in the background image 104. When there is a pixel having the first attribute value equal to "0" (a pixel in a region other than the foreground region) in the reference region (the region having the size of 5×5 pixels and surrounding the target pixel at the center), the background image generation unit 302 sets the pixel value of the pixel having the highest brightness among the pixels having the first attribute value equal to "0" in the reference region as the pixel value of the target pixel in the background image 104. It should be noted that the well-known image processing based on MRC may be applied to generate the background image 104.

An operation of the image processing apparatus 1 having the configuration described above will be explained next. With respect to the operation of the image processing apparatus 1 as a whole, in the image processing apparatus 1, it is supposed that the original document is scanned with the scanner 2 according to the operation of the user, and the scanned signal is supplied to the image reading unit 10. Then, the image reading unit 10 generates the input image according to the input signal, and supplies the input image to the attribute image generation unit 20.

In the next step, the attribute image generation unit 20 (the first attribute image generation unit 201 and the second attribute image generation unit 202) generates the first attribute image (the foreground mask image 102) and the second attribute image according to the input image. After the attribute image generation unit 20 generates the first attribute image and the second attribute image, the attribute image generation unit 20 supplies the first attribute image and the second attribute image to the foreground and background generation unit 30 as the foreground region information.

In the next step, the foreground and background generation unit 30 (the foreground image generation unit 301 and the background image generation unit 302) generates the foreground image 103 and the background image 104 according to the input image and the foreground region information. Then, the image encoding unit 40 encodes the foreground image 103 and the background image 104 with the JPEG method, thereby completing the MRC image 101 (the foreground mask image 102, the foreground image 103, and the background image 104).

In the embodiment, the output format and the output destination of the MRC image 101 generated with the image processing apparatus 1 (the control unit 3) are not limited. For example, the image processing apparatus 1 (the control unit 3) may create the PDF file using the MRC image 101 thus generated, and outputs the PDF file (for example, records in a medium or transmits through communication).

Figure 7:
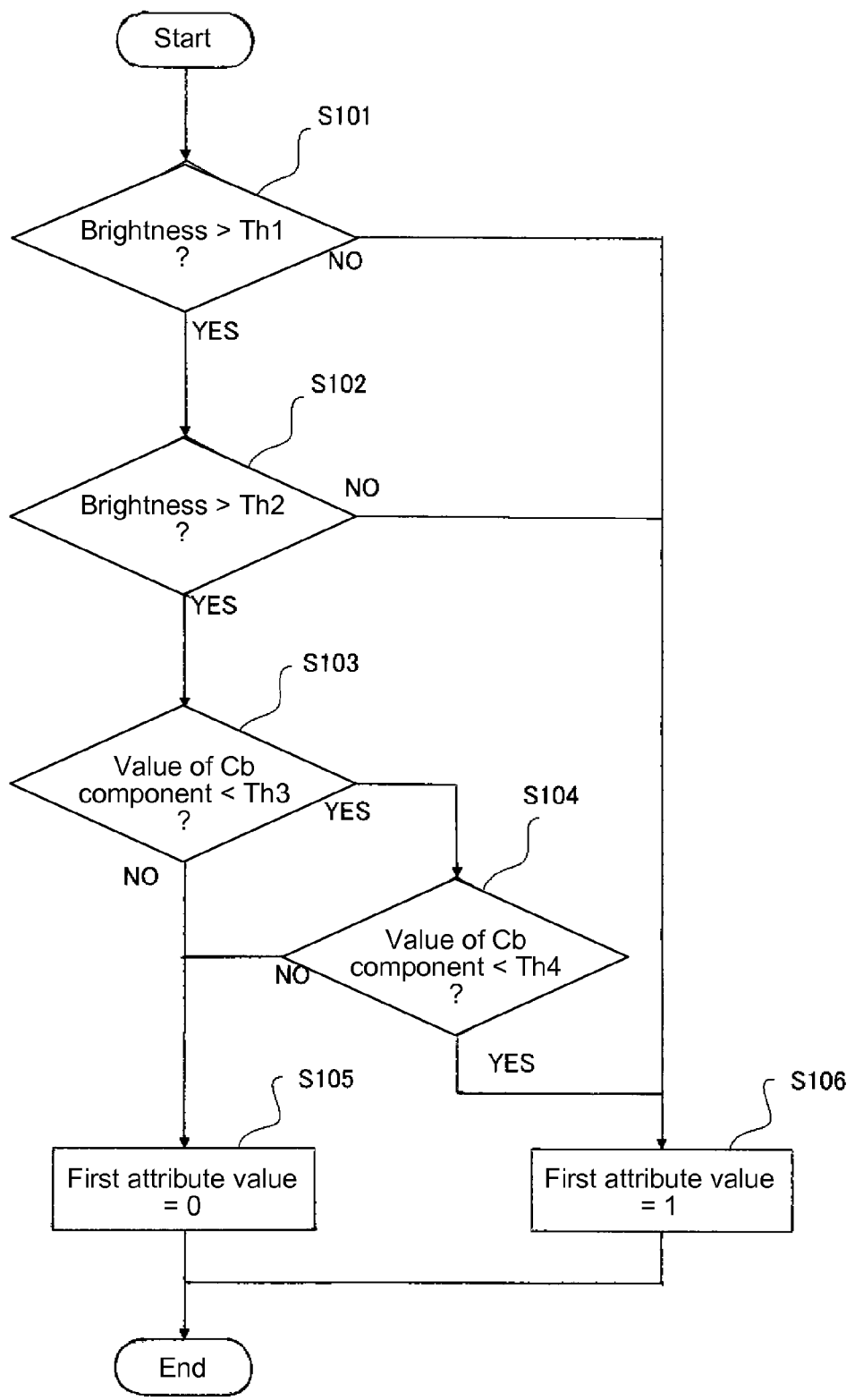
FIG. 7 is a flow chart showing an operation of an attribute image generation unit of the image processing apparatus for determining a first attribute value per pixel according to the first embodiment of the present invention.

An operation of the first attribute image generation unit 201 of the attribute image generation unit 20 for determining the first attribute value (the foreground mask image 102) according to the input image will be explained next with reference to FIG. 7. FIG. 7 is a flow chart showing the operation of the attribute image generation unit 20 of the image processing apparatus 1 for determining the first attribute value per pixel according to the first embodiment of the present invention. More specifically, the first attribute image generation unit 201 of the attribute image generation unit 20 executes the flow chart shown in FIG. 7 per pixel to determine the first attribute value, so that the first attribute image generation unit 201 generates the first attribute image.

In step S101, when the first attribute image generation unit 201 selects the target pixel (an arbitrary pixel), the first attribute image generation unit 201 compares the brightness of the target pixel in the input image with the threshold value Th1. When the first attribute image generation unit 201 determines that the brightness of the target pixel is greater than the threshold value Th1, the process proceeds to step S102. When the first attribute image generation unit 201 determines that the brightness of the target pixel is equal to or smaller than the threshold value Th1, the process proceeds to step S106. In step S106, the first attribute image generation unit 201 determines the first attribute value of the target pixel to be "1".

In step S102, when the first attribute image generation unit 201 determines that the brightness of the target pixel is greater than the threshold value Th1, the first attribute image generation unit 201 calculates the threshold value Th2 based on the average value of the brightness of the surrounding pixels of the target pixel, and compares the brightness of the target pixel with the threshold value Th2. When the first attribute image generation unit 201 determines that the brightness of the target pixel is greater than the threshold value Th2, the process proceeds to step S103. When the first attribute image generation unit 201 determines that the brightness of the target pixel is equal to or smaller than the threshold value Th2, the process proceeds to step S106. In step S106, the first attribute image generation unit 201 determines the first attribute value of the target pixel to be "1".

In step S103, when the first attribute image generation unit 201 determines that the brightness of the target pixel is greater than the threshold value Th2, the first attribute image generation unit 201 calculates the value of the Cb component of the target pixel in the YCbCr color space expression, and compares the value of the Cb component of the target pixel with the threshold value Th3. When the first attribute image generation unit 201 determines that the value of the Cb component of the target pixel is smaller than the threshold value Th3, the process proceeds to step S104. When the first attribute image generation unit 201 determines that the value of the Cb component of the target pixel is equal to or greater than the threshold value Th2, the process proceeds to step S105. In step S105, the first attribute image generation unit 201 determines the first attribute value of the target pixel to be "0".

In step S104, when the first attribute image generation unit 201 determines that the value of the Cb component of the target pixel is smaller than the threshold value Th3, the first attribute image generation unit 201 calculates the threshold value Th4 based on the average value of the Cb components of the surrounding pixels of the target pixel, and compares the value of the Cb component of the target pixel with the threshold value Th4. When the first attribute image generation unit 201 determines that the value of the Cb component of the target pixel is smaller than the threshold value Th4, the process proceeds to step S106. In step S106, the first attribute image generation unit 201 determines the first attribute value of the target pixel to be "1". When the first attribute image generation unit 201 determines that the value of the Cb component of the target pixel is equal to or greater than the threshold value Th4, the process proceeds to step S105. In step S105, the first attribute image generation unit 201 determines the first attribute value of the target pixel to be "0".

Figure 8:
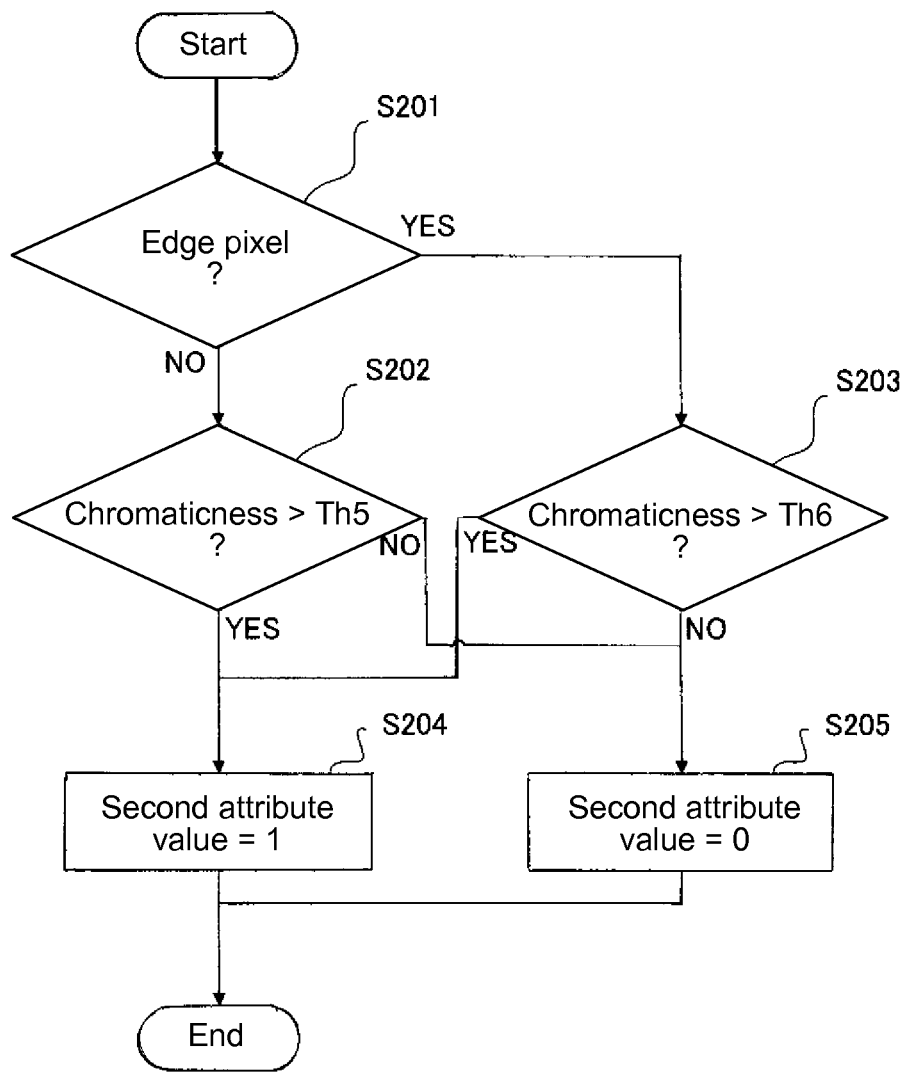
FIG. 8 is a flow chart showing an operation of the attribute image generation unit of the image processing apparatus for determining a second attribute value per pixel according to the first embodiment of the present invention.

An operation of the second attribute image generation unit 202 of the attribute image generation unit 20 for determining the second attribute value according to the input image will be explained next with reference to FIG. 8. FIG. 8 is a flow chart showing the operation of the attribute image generation unit 20 of the image processing apparatus 1 for determining the second attribute value per pixel according to the first embodiment of the present invention. More specifically, the second attribute image generation unit 202 of the attribute image generation unit 20 executes the flow chart shown in FIG. 8 per pixel to determine the second attribute value, so that the second attribute image generation unit 202 generates the second attribute image.

In step S201, when the second attribute image generation unit 202 selects the target pixel (an arbitrary pixel), the second attribute image generation unit 202 determines whether the target pixel is the edge pixel. When the second attribute image generation unit 202 determines that the target pixel is the edge pixel, the process proceeds to step S203. When the second attribute image generation unit 202 determines that the target pixel is not the edge pixel, the process proceeds to step S202. It should be noted that the second attribute image generation unit 202 determines whether the target pixel is the edge pixel with a method that is not limited to a specific one and can be various ones.

In step S202, when the second attribute image generation unit 202 determines that the brightness of the target pixel is not that of the edge pixel, the second attribute image generation unit 202 calculates the chromaticness of the target pixel, and compares the chromaticness of the target pixel with the threshold value Th5. When the second attribute image generation unit 202 determines that the chromaticness of the target pixel is greater than the threshold value Th5, the process proceeds to step S204. In step S204, the second attribute image generation unit 202 determines the second attribute value of the target pixel to be "1". When the second attribute image generation unit 202 determines that the chromaticness of the target pixel is equal to or smaller than the threshold value Th5, the process proceeds to step S205. In step S205, the second attribute image generation unit 202 determines the second attribute value of the target pixel to be "0".

In step S203, when the second attribute image generation unit 202 determines that the brightness of the target pixel is that of the edge pixel, the second attribute image generation unit 202 calculates the chromaticness of the target pixel, and compares the chromaticness of the target pixel with the threshold value Th6. When the second attribute image generation unit 202 determines that the chromaticness of the target pixel is greater than the threshold value Th6, the process proceeds to step S204. In step S204, the second attribute image generation unit 202 determines the second attribute value of the target pixel to be "1". When the second attribute image generation unit 202 determines that the chromaticness of the target pixel is equal to or smaller than the threshold value Th6, the process proceeds to step S205. In step S205, the second attribute image generation unit 202 determines the second attribute value of the target pixel to be "0".

Figure 9:
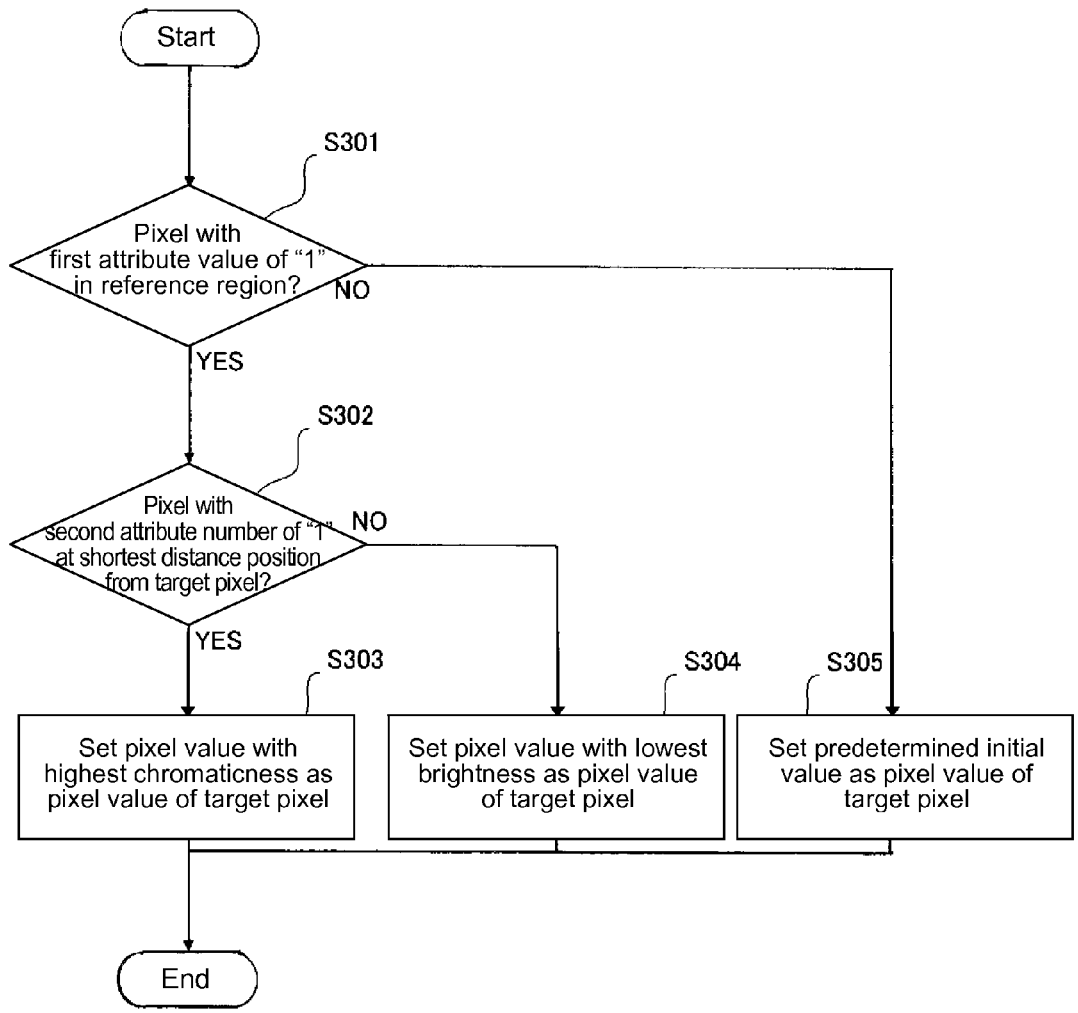
FIG. 9 is a flow chart showing the operation of the foreground and background generation unit of the image processing apparatus for determining the pixel value of the foreground image according to the first embodiment of the present invention.

An operation of the foreground image generation unit 301 of the foreground and background generation unit 30 for generating the foreground image 103 will be explained next with reference to FIG. 9. FIG. 9 is a flow chart showing the operation of the foreground and background generation unit 30 of the image processing apparatus 1 for determining the pixel value of the foreground image 103 according to the first embodiment of the present invention. More specifically, the foreground image generation unit 301 of the foreground and background generation unit 30 executes the flow chart shown in FIG. 9 per pixel to determine the pixel value of the foreground image 103.

First, the foreground image generation unit 301 selects the target pixel, and determines the reference region surrounding the target pixel thus selected. In the embodiment, it is supposed that the foreground image generation unit 301 determines the reference region as the region of 5×5 pixels surrounding the target pixel as shown in FIGS. 5 and 6.

In step S301, the foreground image generation unit 301 determines whether there is the pixel with the first attribute value of "1" in the reference region. When the foreground image generation unit 301 determines that there is the pixel with the first attribute value of "1" in the reference region, the process proceeds to step S302. When the foreground image generation unit 301 determines that there is not the pixel with the first attribute value of "1" in the reference region, the process proceeds to step S305. In step S305, the foreground image generation unit 301 sets the specific value to the pixel value of the target pixel in the foreground image 103 (referred to as a predetermined initial value).

It should be noted that, in the foreground image 103, the pixel not in the foreground region is not present in the decoded image. However, in order to obtain a high compression rate upon encoding (compressing), an identical number may be collectively set to the predetermined initial value. For example, in the case that the original document contains the black text in the white base, the pixel value indicating black may be collectively set to the predetermined initial value. Further, in the foreground image generation unit 301, instead of the predetermined initial value, the pixel value of the target pixel in the input image may be applied as is, or a specific number based on the surrounding pixels (for example, an average value of the pixel values of the surrounding pixels) of the target pixel in the input image may be applied.

In step S302, when the foreground image generation unit 301 determines that there is the pixel with the first attribute value of "1" in the reference region in step S301, the foreground image generation unit 301 determines whether there is the pixel with the second attribute number of "1" at the shortest distance position from the target pixel. When the foreground image generation unit 301 determines that there is the pixel with the second attribute number of "1", the process proceeds to step S303. When the foreground image generation unit 301 determines that there is not the pixel with the second attribute number of "1", the process proceeds to step S304.

In step S303, when the foreground image generation unit 301 determines that there is the pixel with the second attribute number of "1" in step S302, the foreground image generation unit 301 refers to the pixel value of the pixel with the highest chromaticness in the reference region of the input image, and sets the pixel value as the pixel value of the target pixel in the foreground image 103.

In step S304, when the foreground image generation unit 301 determines that there is not the pixel with the second attribute number of "1" in step S302, the foreground image generation unit 301 refers to the pixel value of the pixel with the lowest brightness in the reference region of the input image, and sets the pixel value as the pixel value of the target pixel in the foreground image 103.

Figure 10:
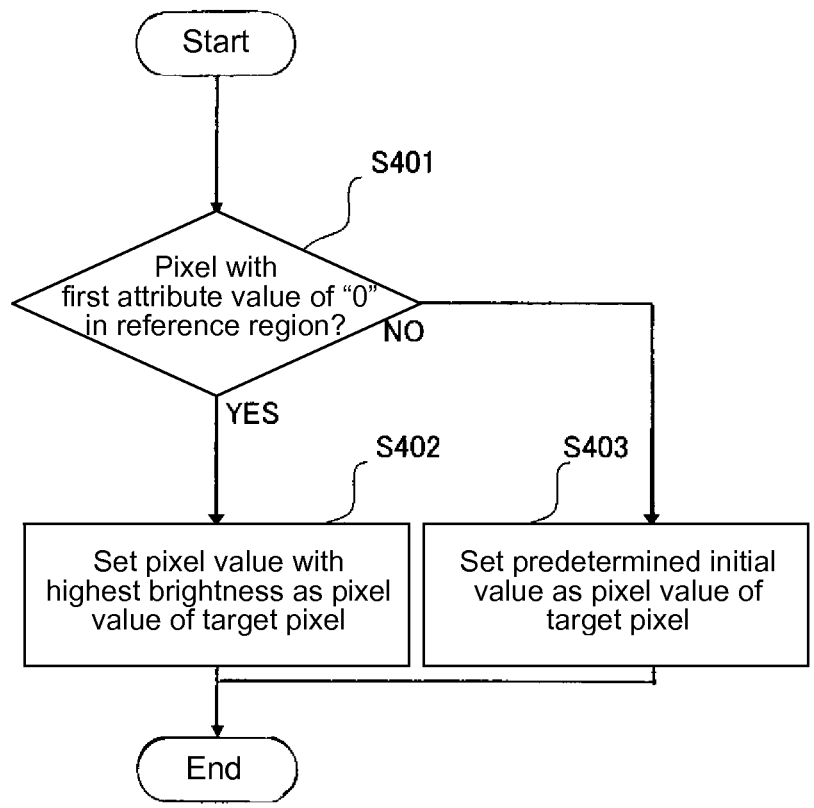
FIG. 10 is a flow chart showing the operation of the foreground and background generation unit of the image processing apparatus for determining the pixel value of the background image according to the first embodiment of the present invention.

An operation of the background image generation unit 302 of the foreground and background generation unit 30 for generating the background image 104 will be explained next with reference to FIG. 10. FIG. 10 is a flow chart showing the operation of the foreground and background generation unit 30 of the image processing apparatus 1 for determining the pixel value of the background image 104 according to the first embodiment of the present invention. More specifically, the background image generation unit 302 of the foreground and background generation unit 30 executes the flow chart shown in FIG. 10 per pixel to determine the pixel value of the background image 104.

First, the background image generation unit 302 selects the target pixel, and determines the reference region surrounding the target pixel thus selected. In the embodiment, it is supposed that the background image generation unit 302 determines the reference region as the region of 5×5 pixels surrounding the target pixel as shown in FIGS. 5 and 6.

In step S401, the background image generation unit 302 determines whether there is the pixel with the first attribute value of "0" in the reference region. When the background image generation unit 302 determines that there is the pixel with the first attribute value of "0" in the reference region, the process proceeds to step S402. When the background image generation unit 302 determines that there is not the pixel with the first attribute value of "0" in the reference region, the process proceeds to step S403. In step S403, the background image generation unit 302 sets the predetermined initial value to the pixel value of the target pixel in the background image 104. The predetermined initial value related to the background image 104 may be the same as that related to the foreground image 103, or may be a different value.

In step S402, when the foreground image generation unit 301 determines that there is the pixel with the first attribute value of "0" in the reference region in step S401, the background image generation unit 302 sets the pixel value of the pixel with the highest brightness among the pixels with the first attribute value of "0" as the pixel value of the target pixel.

In the first embodiment of the present invention, it is possible to obtain the following effects. In the image processing apparatus 1, when the foreground image 103 or the background image 104 is generated, in addition to the first attribute value pertaining to the brightness, the second attribute value pertaining to the chromaticness is utilized. More specifically, in the image processing apparatus 1, when the target pixel is determined for determining the pixel value of the target pixel related to the foreground image 103 or the background image 104, the first attribute image and the second attribute image are utilized. As a result, in the foreground image 103 and the background image 104 generated with the image processing apparatus 1, the appropriate stress processing is applied whether the color of the specific region (the region including the text region and/or the line region) is the achromatic color or the chromatic color. Accordingly, in the decoded image of the MRC image 101 generated with the image processing apparatus 1, it is possible to obtain the image with visually good image quality in the specific region and the surrounding region thereof.

Figure 11:
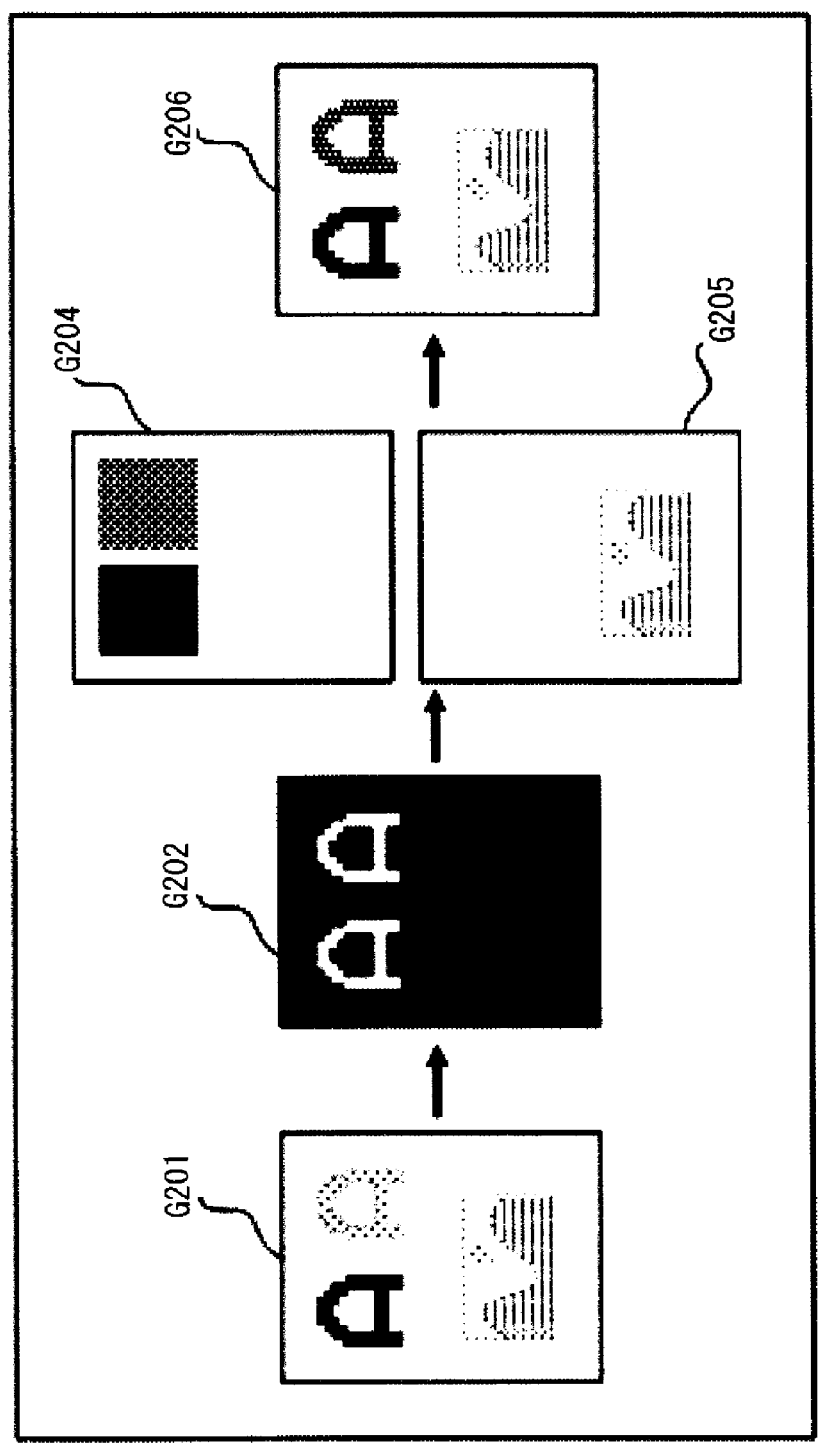
FIG. 11 is a schematic view No. 1 showing an example of images for explaining the effects of the image processing apparatus according to the first embodiment of the present invention.
Figure 12:
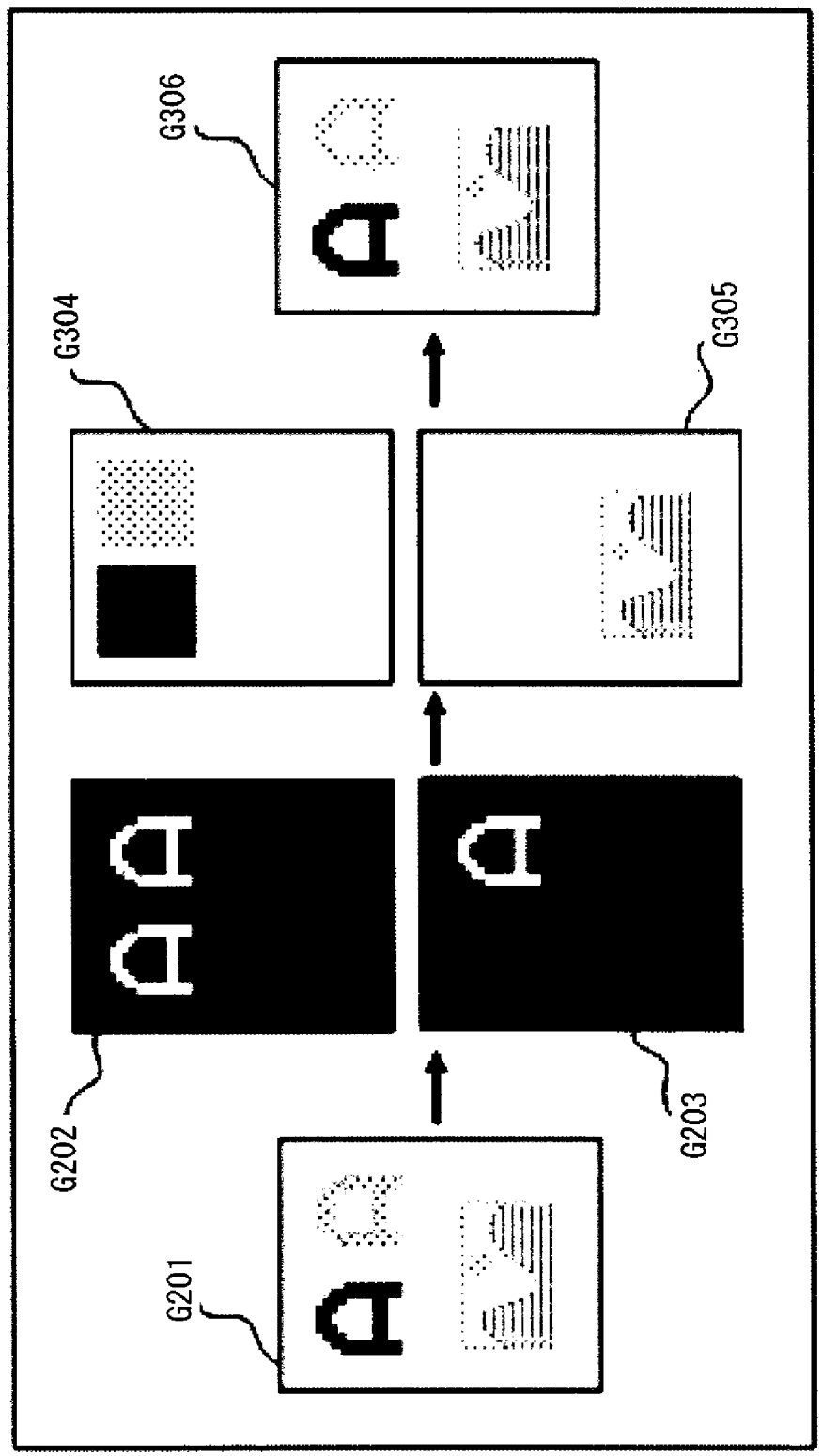
FIG. 12 is a schematic view No. 2 showing an example of images for explaining the effects of the image processing apparatus according to the first embodiment of the present invention.

The effects of the image processing apparatus 1 described above will be explained in more detail with reference to FIGS. 11 and 12. FIG. 11 is a schematic view No. 1 showing an example of images for explaining the effects of the image processing apparatus 1 according to the first embodiment of the present invention. FIG. 12 is a schematic view No. 2 showing an example of images for explaining the effects of the image processing apparatus 1 according to the first embodiment of the present invention.

More specifically, FIG. 12 shows an example in the case that the image processing apparatus 1 processes the input image G201. FIG. 11 shows an example in the case that the image processing apparatus 1 processes the input image G201 under an assumption that only the foreground mask image 102 (the first attribute image) is used to generate the foreground image 103 and the background image 104 without using the second attribute image upon generating the foreground image 103. As shown in FIGS. 11 and 12, in the input image G201, a text string "AA" is depicted at an upper portion thereof, and a background image is depicted at a lower portion thereof. Further, in the input image, it is supposed that "A" at the upper left side is depicted with the black text (the text in the achromatic color), and "A" at the upper right side is depicted with the color text (the text in the chromatic color).

As described above, in the example shown in FIG. 11, the image processing apparatus 1 generates the foreground mask image G202 (the first attribute image) according to the input image G201. Further, the image processing apparatus 1 generates the foreground image G204 and the background image G205 using only the foreground mask image G202 as the foreground region information.

In the example shown in FIG. 11, it is supposed that when the image processing apparatus 1 determines the pixel value of the target pixel in the process of generating the foreground image G204, only the brightness is collectively focused to determine the pixel value of the target pixel. More specifically, in the example shown in FIG. 11, in the flow chart shown in FIG. 9, the image processing apparatus 1 skips step S302 and step S303, so that the process in step S304 is performed when the foreground image generation unit 301 determines that there is the pixel with the first attribute value of "1" in step S301.

It should be noted that, for the purpose of the simple explanation, in the foreground mask image G202 shown in FIGS. 11 and 12, only the text region of the text string "AA" at the upper portion is extracted. Further, in the example shown in FIG. 11, the MRC image contains the foreground mask image G202, and the foreground image G204 and the background image G205 encoded with the JPEG method, and the MRC image is decoded to obtain the decoded image G206.

Further, it should be noted that in the foreground mask image G202 and the second attribute image G303 shown in FIGS. 11 and 12, the region with the invalid attribute (the value is "0") is depicted in black, and the region with the valid attribute (the value is "1") is depicted in white.

In the example shown in FIG. 12, the image processing apparatus 1 generates the foreground mask image G202 (the first attribute image) and the second attribute image G303 according to the input image G201. Further, the image processing apparatus 1 generates the foreground image G304 and the background image G305 using the foreground mask image G202 and the second attribute image G303 as the foreground region information. Further, in the example shown in FIG. 12, the MRC image contains the foreground mask image G202, and the foreground image G304 and the background image G305 encoded with the JPEG method, and the MRC image is decoded to obtain the decoded image G306.

As described above, in the example shown in FIG. 11, when the image processing apparatus 1 determines the pixel value of the target pixel in the process of generating the foreground image G204, only the brightness is collectively focused to determine the pixel value of the target pixel. Accordingly, in the foreground image G204 and the decoded image G206, the color of the region of the color text (the image "A" of the color text at the upper right side) may become dull.

On the other hand, in the example shown in FIG. 12, when the image processing apparatus 1 determines the pixel value of the target pixel in the process of generating the foreground image G304, the method for determining the pixel value in the foreground image (determining the pixel value of the target pixel based on the brightness), which is effective to the achromatic color, is applied in the region having the second attribute number of "0" (that is, the region of the black text "A" at the upper left portion). Further, when the image processing apparatus 1 generates the foreground image G304, the method for determining the pixel value in the foreground image (determining the pixel value of the target pixel based on the chromaticness), which is effective to the chromatic color, is applied in the region having the first attribute value of "1" and the second attribute number of "1" (that is, the region of the color text "A" at the upper right portion).

Accordingly, in the example shown in FIG. 12, it is possible to obtain the decoded image G306 with good image quality for easy recognition with respect to both the black text and the color text. Especially, in the example shown in FIG. 12, different from the example shown in FIG. 11, it is possible to obtain good image quality having less dullness in the region of the color text in the decided image G306.

Second Embodiment

A second embodiment of the present invention will be explained next with reference to the accompanying drawings. In the second embodiment, an image forming apparatus 1A has a configuration similar to that shown in FIG. 2, except that the control unit 3 in the first embodiment is replaced with a control unit 3A.

Figure 13:
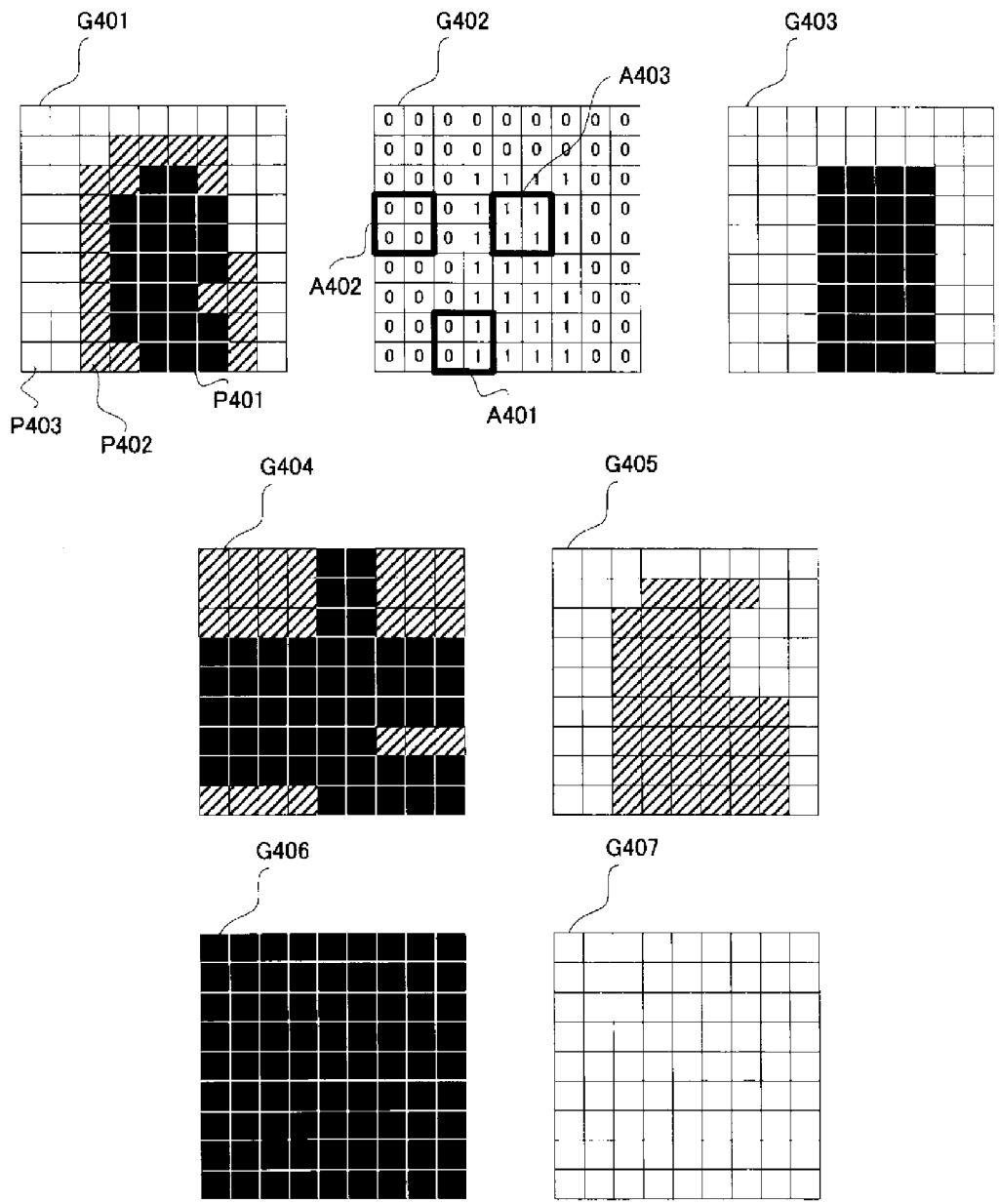
FIG. 13 is a schematic view showing enlarged images processed with the image processing apparatus according to the first embodiment of the present invention.

An issue of the image processing apparatus 1 in the first embodiment will be explained next with reference to FIG. 13. FIG. 13 is a schematic view showing enlarged images G401 to G407 (images expressed with the pixels 9×9) processed with the image processing apparatus 1 according to the first embodiment of the present invention.

As shown in FIG. 13, the pixel value (the brightness) of each pixel is represented with a pattern in the rectangular frame of each pixel in the images G401 and G403 to G407. For example, in the image G401, a pixel with the solid frame such as a pixel P401 has the lowest brightness, and a pixel with an empty frame such as a pixel P403 has the highest brightness. Further, a pattern assigned to a pixel P402 has the brightness between those of the pixel P401 and the pixel P403. The image G402 is the foreground mask image, and represents the first attribute values corresponding to each of the images G401 and G403 to G407.

As shown in FIG. 13, the image G401 represents a part of the input image to be pressed with the control unit 3, and contains the text region (the line constituting the text). The image G402 represents the foreground image (the first attribute value of each pixel) corresponding to the region of the image G401. It is supposed that the foreground mask image G402 is obtained with the image processing apparatus 1 in the first embodiment. The image G403 represents the decoded result of the ideal MRC image representing the shape of the text. In the foreground and background generation unit 30 of the image processing apparatus 1 in the first embodiment, in order to obtain the image G403, it is necessary to obtain the ideal foreground image G406 and the ideal background image G407.

However, when the pixel values of the image G401 are simply spread from the corresponding region of the foreground and the background according to the foreground mask image G402, there may be obtained an image (for example, the image G404 in FIG. 13), in which the pixel value of the edge region is mixed with the color of the text considered as the foreground, or an image (for example, the image G405 in FIG. 13), in which the pixel value of the edge region is mixed with the color of the base considered as the background. When the image G404 or the image the image encoding unit 405 are non-reversibly compressed with the JPEG method, the pixel value of the edge region is spread to the surrounding as a noise, thereby deteriorating the image quality of the decoded image. Further, as compared with the ideal foreground image G406 and the ideal background image G407, the foreground image G404 and the background image G405 contaminated with the pixel value of the edge region tend to lack image uniformity, thereby deteriorating the compression efficiency.

To this end, in order to properly refer to the pixel value of the text and the line suitable for MRC, when the foreground image 103 is generated, it is preferred to preferentially refer to the pixel value (select as the target pixel) in the region inside the edge region (for example, the region A403 in the foreground mask image G402 in FIG. 13) among the specific region (the text region and the line region) relative to the edge region (for example, the region A401 in the foreground mask image G402 in FIG. 13) of the specific region. Further, when the background image 104 is generated, it is preferred to preferentially refer to the pixel value (select as the target pixel) in the background region other than the specific region (for example, the region A402 in the foreground mask image G402 in FIG. 13) relative to the edge region (for example, the region A401 in the foreground mask image G402 in FIG. 13) of the specific region, thereby making it possible to properly refer to the pixel value of the background suitable for MRC.

Accordingly, in the second embodiment, the image processing apparatus 1A (the control unit 3A) is configured to generate the foreground image 103 and the background image 104 from the first attribute image using the image, in which the edge region related to the specific region is invalid (the first attribute value of the edge pixel is set to "0").

Figure 14:
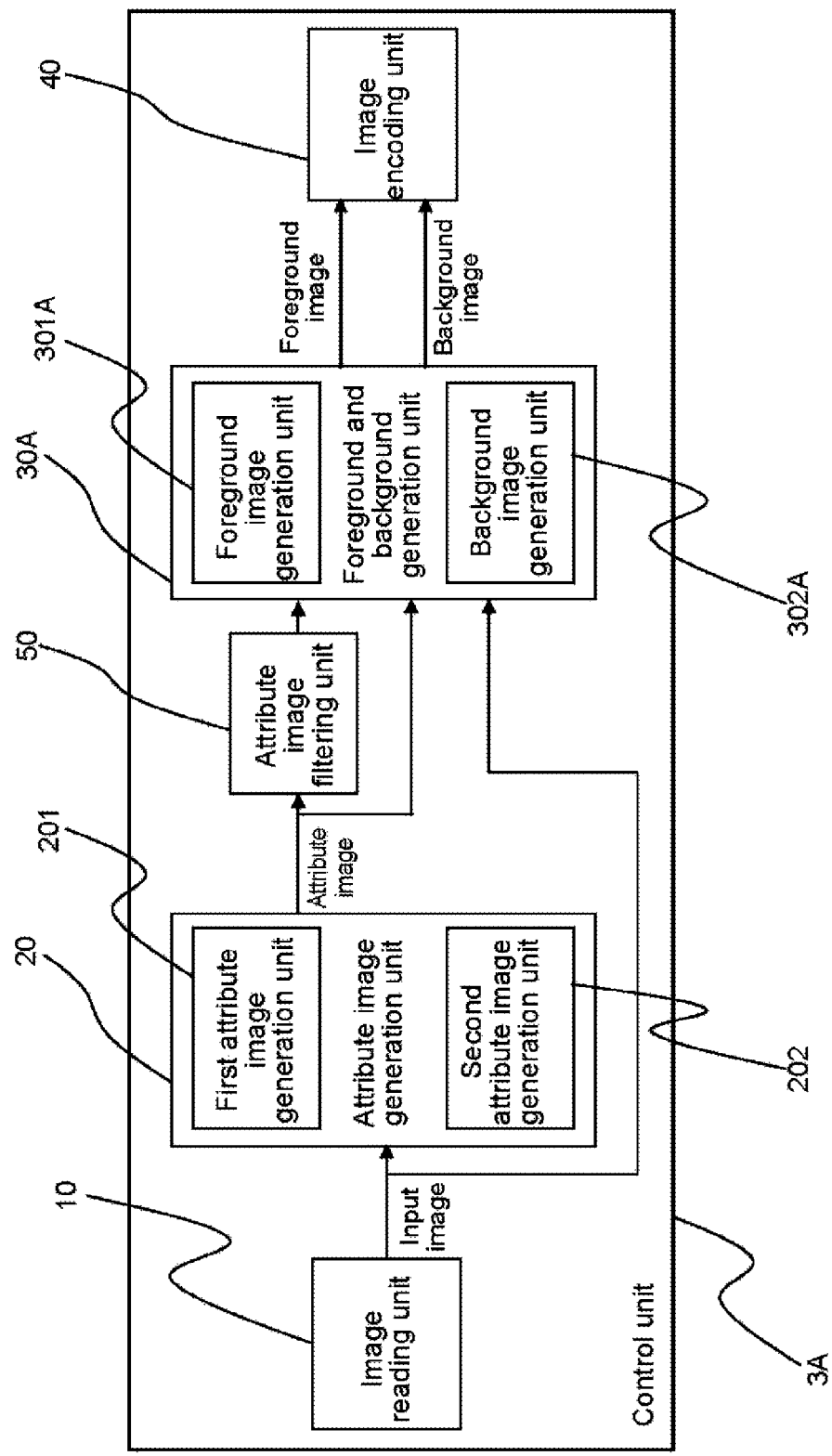
FIG. 14 is a block diagram showing a functional configuration of a control unit of an image processing apparatus according to a second embodiment of the present invention.

An internal configuration of the control unit 3A of the image processing apparatus 1A will be explained next in more detail. FIG. 14 is a block diagram showing a functional configuration of the control unit 3A of the image processing apparatus 1A according to a second embodiment of the present invention. As shown in FIG. 14, different from the control unit 3 in the first embodiment, the control unit 3A additionally includes an attribute image filtering unit 50. Further, different from the control unit 3 in the first embodiment, the control unit 3 includes a foreground image generation unit 301A and a background image generation unit 302A, instead of the foreground image generation unit 301 and the background image generation unit 302.

In the embodiment, the attribute image filtering unit 50 as a first attribute image processing unit is configured to perform a process of removing the pixels of the edge region (setting the first attribute value to "0") from the foreground region through applying a filtering process to the first attribute image. Further, the attribute image filtering unit 50 is configured to supply the first attribute image (referred to as a filtered first attribute image) to the foreground and background generation unit 30 after the filtering process is applied to the first attribute image.

In the embodiment, the attribute image filtering unit 50 performs the filtering process with a method not limited to specific one. For example, the attribute image filtering unit 50 may perform the filtering process using a coefficient matrix expressed with the following equation (8):

$$\begin{pmatrix} 1/8 & 1/8 & 1/8 \\ 1/8 & 1/8 & 1/8 \\ 1/8 & 1/8 & 1/8 \end{pmatrix} \quad (8)$$

In the embodiment, the attribute image filtering unit 50 determines the first attribute value of the target pixel after the filtering process using the equation (8) according to a distribution state of the foreground pixels (the pixels with the attribute value of "1" in the first attribute image) in a region in a specific range with the target pixel at the center thereof (referred to as a filtering reference region). More specifically, the attribute image filtering unit 50 calculates the first attribute value in the filtering reference region (the region with the pixels 3×3) with the target pixel at the center thereof through inputting the first attribute value to the coefficient matrix expressed with the equation (8). Then the attribute image filtering unit 50 determines the first attribute value of the target pixel after the filtering process using a value calculated based on the coefficient matrix expressed with the equation (8).

In the embodiment, when the value of the target pixel calculated based on the coefficient matrix expressed with the equation (8) is equal to or greater than "1", the attribute image filtering unit 50 determines the first attribute value of the target pixel (the first attribute value in the filtered first attribute image) as "1". When the value of the target pixel is not equal to or greater than "1", the attribute image filtering unit 50 determines the first attribute value of the target pixel as "0". For example, when the first attribute value of each pixel in the filtering reference region (the region with the pixels 3×3) is applied to the equation (8), and there are eight or more pixels with the first attribute value of "1" in the filtering reference region, the calculated value is "1". When there are pixels less than eight (equal to or less than seven) with the first attribute value of "1" in the filtering reference region, the calculated value becomes less than "1".

As described above, in the embodiment, the attribute image filtering unit 50 applies the filtering process to the first attribute image, and generates the filtered first attribute image.

In the embodiment, in consideration of the case that the specific region itself may be deleted in addition to the edge region through the filtering process, the foreground image generation unit 301A of the foreground and background generation unit 30A determines the pixel value of the foreground image 103 according to the first attribute image before the filtering process when there is no pixel with the first attribute value of "1" in the reference region.

Further, when the foreground image generation unit 301A determines the pixel value of the target pixel in the foreground image 103 (the target pixel when there is the pixel with the first attribute value of "1" in the reference region), the foreground image generation unit 301A determines whether there is the pixel with the first attribute value of "1" and the second attribute value of "1" at the nearest location of the target pixel (the pixel adjacent to the target pixel).

In the embodiment, when the foreground image generation unit 301A determines that there is the pixel with the second attribute value of "1" in the pixels adjacent to the target pixel among the pixels with the first attribute value of "1" in the reference region, the foreground image generation unit 301A calculates an evaluation value Es as a value based on the chromaticness and a distance from the target pixel relative to each pixel with the first attribute value of "1" in the reference region. Then, the foreground image generation unit 301A refers to the pixel value of the pixel with the first attribute value of "1" and the largest evaluation value Es in the reference region, and determines the pixel value of the target pixel in the foreground image 103.

Further, when the foreground image generation unit 301A determines that there is not the pixel with the second attribute value of "1" in the pixels adjacent to the target pixel among the pixels with the first attribute value of "1" in the reference region, the foreground image generation unit 301A calculates an evaluation value Ev1 as a value based on the brightness and the distance from the target pixel relative to each pixel with the first attribute value of "1" in the reference region. Then, the foreground image generation unit 301A refers to the pixel value of the pixel with the first attribute value of "1" and the largest evaluation value Ev1 in the reference region, and determines the pixel value of the target pixel in the foreground image 103.

As described above, in the first embodiment, when the reference pixel of the target pixel is determined, the brightness and the chromaticness are evaluated relative to each pixel in the reference region. In the second embodiment, the foreground image generation unit 301A determines the reference pixel of the target pixel further using the distance from the target pixel.

In the embodiment, the pixel used for calculating the evaluation value Es and the evaluation value Ev1 is referred to as an evaluation pixel. Further, the foreground image generation unit 301A calculates the evaluation value Es and the evaluation value Ev1 with an equation that is not limited to specific one. For example, the foreground image generation unit 301A may calculate the evaluation value Es and the evaluation value Ev1 with the following equations (9) and (10):

$$Es = a1 \times S + a2 \times (L\max - L) \quad (9)$$

$$Ev1 = a1 \times (V\max - V) + a2 \times (L\max - L) \quad (10)$$

In the equations (9) and (10), a1 represents a coefficient related to a pixel value of the pixel; S represents the chromaticness of the pixel; a2 represents a coefficient related to the evaluation pixel and the distance from the target pixel; Lmax represents a maximum distance between the evaluation pixel and the target pixel; L represents the distance between the evaluation pixel and the target pixel; Vmax represents a maximum brightness of the evaluation pixel; V represents the brightness of the evaluation pixel.

In the embodiment, a1, a2, Vmax, and Lmax are expressed with the following equations (11) to (14):

$$a1=1 \quad (11)$$

$$a2=80 \quad (12)$$

$$V\text{max}=255 \quad (13)$$

$$L\text{max}=4 \quad (14)$$

In the embodiment, Vmax is the maximum value of the brightness possible in the entire region of the image. When the value of Vmax−V increases, that is, the brightness V decreases, the brightness difference relative to the background image increases. Accordingly, the evaluation value Ev1 in the equation (10) increases. With respect to a ratio of a1 and a2 (a1/a2), when a1/a2 is set to be a larger value, as opposed to the case when a1/a2 is set to be a smaller value, a probability of referring to the pixel farther from the target pixel increases. As a result, the text color tends to be deviated from the original image to a larger extent. However, the brightness difference in the text region between the foreground image and the background image increases, thereby making it possible to obtain the image effective for a human to recognize the text.

In the embodiment, the background image generation unit 302A of the foreground and background generation unit 30A is configured to generate the background image 104 using the first attribute image before the filtering process and the filtered first attribute image as a part of the foreground region information.

In the embodiment, the control unit 32A determines the pixel value of the background image 104 with a method that is not limited to specific one, and the following method may be adopted. First, the background image generation unit 302A is configured to calculate an evaluation value Ev2 based on the brightness and the distance from the target pixel relative to each pixel with the first attribute value of "0" in the reference region. Then, the background image generation unit 302A determines the pixel value of the pixel with the largest evaluation value Ev2 and the first attribute value of "0" in the reference region as the pixel value of the target pixel in the background image 104.

In the embodiment, the control unit 32A determines the evaluation value Ev2 with an equation that is not limited to specific one, and may determine the evaluation value Ev2 with the following equation (15):

$$Ev2=a1 \times V + a2 \times (L\text{max}-L) \quad (15)$$

In the embodiment, the image encoding unit 40 encodes the foreground image 103 and the background image 104 generated with the foreground and background generation unit 30A with the JPEG method. Then, the image encoding unit 40 combines the foreground mask image 102 based on the first attribute image with the foreground image 103 and the background image 104 thus encoded to be output as the MRC image 101.

In the embodiment, the foreground mask image 102 to be set to the MRC image 101 output from the control unit 3A may be, for example, the first attribute image before the filtering process. Alternatively, the foreground mask image 102 may be a composite image of the first attribute image and the filtered first attribute image. Further, the control unit 3A sets the pixel value of the composite image as the value of the first attribute image only for the pixel determined using the first attribute image when the foreground and background generation unit 30A (the foreground image generation unit 301A) determines the pixel value of the foreground image 103.

An operation of the image processing apparatus 1A having the configuration described above will be explained next. In the following description, in the image processing apparatus 1A in the second embodiment, the difference from the first embodiment will be mainly explained.

With respect to the operation of the image processing apparatus 1A as a whole, except the filtering process performed with the attribute image filtering unit 50 and the process of the foreground and background generation unit 30A, the operation is similar to that of the image processing apparatus 1, and explanations thereof are omitted.

Figure 15:
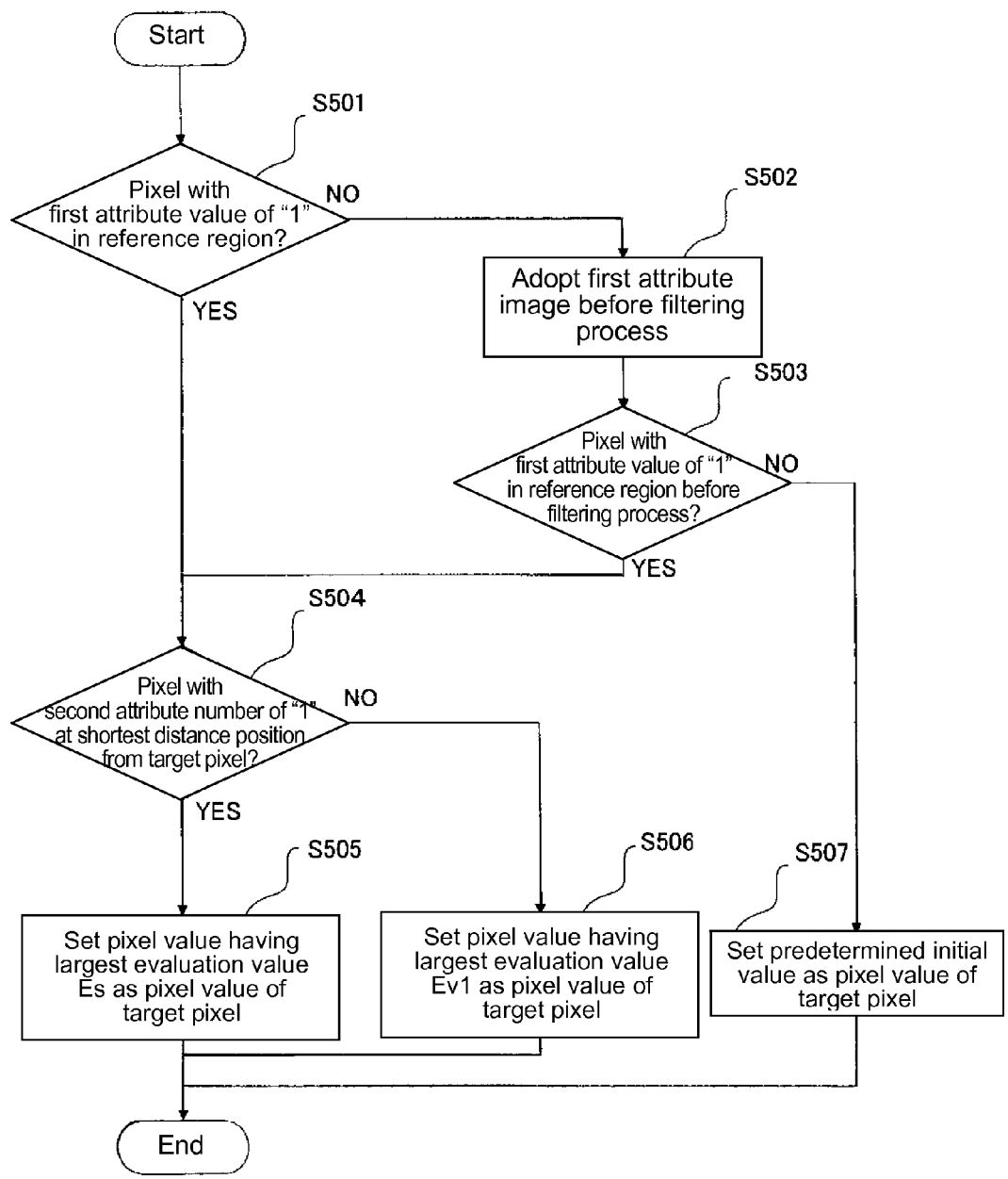
FIG. 15 is a flow chart showing an operation of a foreground and background generation unit of the image processing apparatus for determining the pixel value of the foreground image according to the second embodiment of the present invention.

An operation of the foreground image generation unit 301A of the foreground and background generation unit 30A for generating the foreground image 103 will be explained next with reference to FIG. 15. FIG. 15 is a flow chart showing the operation of the foreground and background generation unit 30A of the image processing apparatus 1A for determining the pixel value of the foreground image 103 according to the second embodiment of the present invention. More specifically, the foreground image generation unit 301A of the foreground and background generation unit 30A executes the flow chart shown in FIG. 15 per pixel to determine the pixel value of the foreground image 103.

First, the foreground image generation unit 301A selects the target pixel, and determines the reference region surrounding the target pixel thus selected. In the embodiment, it is supposed that the foreground image generation unit 301A determines the reference region as the region of 5×5 pixels surrounding the target pixel as shown in FIGS. 5 and 6.

In step S501, the foreground image generation unit 301A determines whether there is the pixel with the first attribute value of "1" in the reference region. When the foreground image generation unit 301A determines that there is the pixel with the first attribute value of "1" in the reference region, the process proceeds to step S504. When the foreground image generation unit 301 determines that there is not the pixel with the first attribute value of "1" in the reference region, the process proceeds to step S502.

In step S502, when the foreground image generation unit 301A determines that there is not the pixel with the first attribute value of "1" in the reference region in step S501, the foreground image generation unit 301A determines that the first attribute image before the filtering process is adopted to determine the pixel value of the target pixel in the foreground image 103. In step S503, the foreground image generation unit 301A determines whether there is the pixel with the first attribute number of "1" in the reference region of the first attribute image before the filtering process. When the background image generation unit 302 determines that there is not the pixel with the first attribute number of "1" in the reference region, the process proceeds to step S504. When the foreground image generation unit 301A determines that there is the pixel with the first attribute number of "1" in the reference region, the process proceeds to step S507. In step S507, the foreground image generation unit 301A sets the predetermined initial value to the pixel value of the target pixel in the foreground image 103.

In step S504, when the foreground image generation unit 301A determines that there is the pixel with the first attribute number of "1" in the reference region in step S501 or step S503, the foreground image generation unit 301 determines whether there is the pixel with the second attribute number of "1" at the shortest distance position from the target pixel.

When the foreground image generation unit 301 determines that there is the pixel with the second attribute number of "1", the process proceeds to step S506. When the foreground image generation unit 301 determines that there is not the pixel with the second attribute number of "1", the process proceeds to step S506.

It should be noted that, in the process from step S504 to step S506, the foreground image generation unit 301A determines the pixel in the first attribute image before the filtering process when the process in step S502 is performed. Otherwise, the foreground image generation unit 301A determines the pixel in the filtered first attribute image. In other words, when the foreground image generation unit 301A confirms the first attribute value, the foreground image generation unit 301A refers to the filtered first attribute image as default.

In step S505, when the foreground image generation unit 301A determines that there is the pixel with the second attribute number of "1" in step S504, the foreground image generation unit 301A calculates the evaluation value Es per each pixel with the first attribute value of "1" in the reference region. Then, the foreground image generation unit 301 sets the pixel value of the pixel with the first attribute value of "1" having the largest evaluation value Es as the pixel value of the target pixel in the foreground image 103.

In step S506, when the foreground image generation unit 301A determines that there is not the pixel with the second attribute number of "1" in step S504, the foreground image generation unit 301A calculates the evaluation value Ev1 per each pixel with the first attribute value of "1" in the reference region. Then, the foreground image generation unit 301 sets the pixel value of the pixel with the first attribute value of "1" having the largest evaluation value Ev1 as the pixel value of the target pixel in the foreground image 103.

Figure 16:
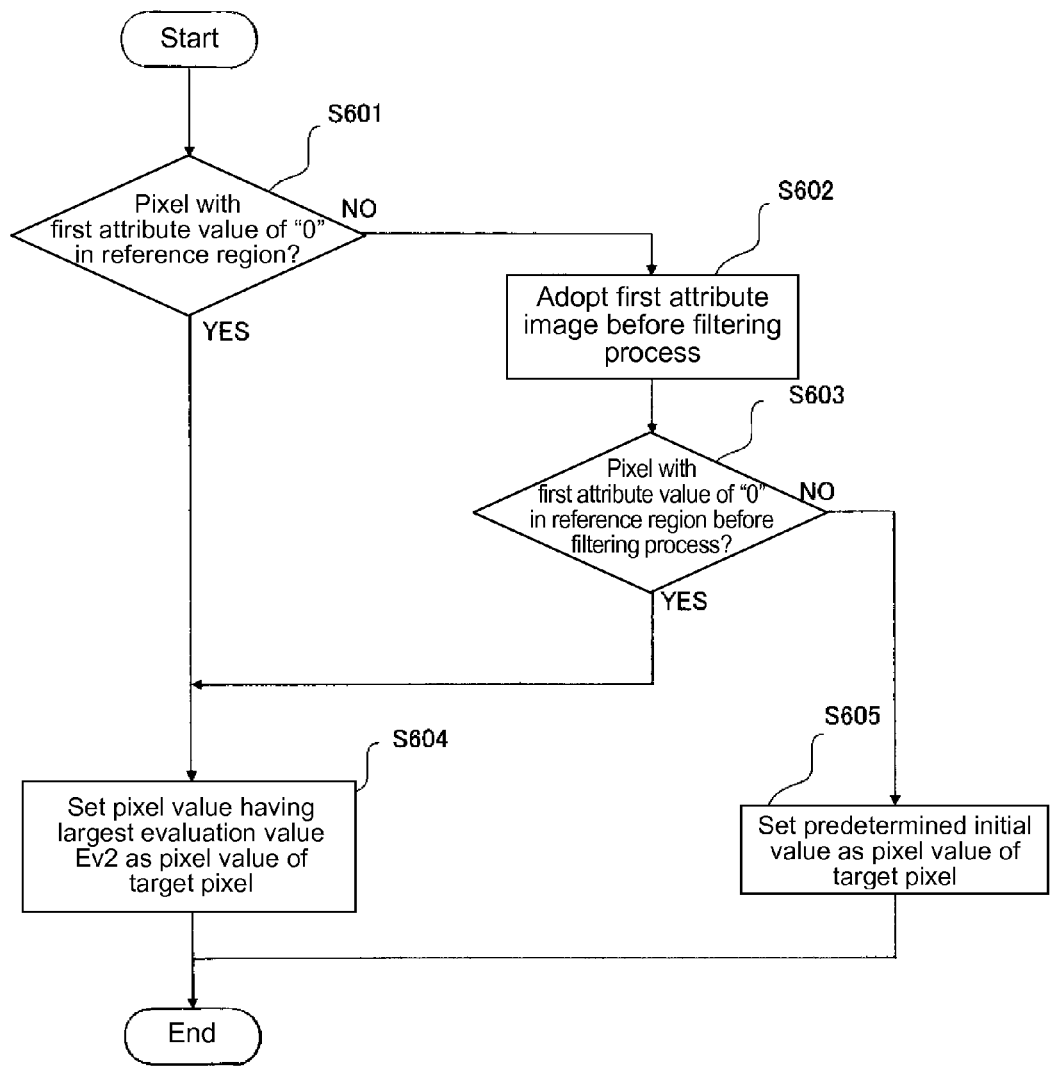
FIG. 16 is a flow chart showing the operation of the foreground and background generation unit of the image processing apparatus for determining the pixel value of the background image according to the second embodiment of the present invention.

An operation of the background image generation unit 302A of the foreground and background generation unit 30A for generating the background image 104 will be explained next with reference to FIG. 16. FIG. 16 is a flow chart showing the operation of the foreground and background generation unit 30A of the image processing apparatus 1A for determining the pixel value of the background image 104 according to the second embodiment of the present invention. More specifically, the background image generation unit 302A of the foreground and background generation unit 30A executes the flow chart shown in FIG. 16 per pixel to determine the pixel value of the background image 104.

First, the background image generation unit 302A selects the target pixel, and determines the reference region surrounding the target pixel thus selected. In the embodiment, it is supposed that the background image generation unit 302A determines the reference region as the region of 5×5 pixels surrounding the target pixel as shown in FIGS. 5 and 6.

In step S601, the background image generation unit 302A determines whether there is the pixel with the first attribute value of "0" in the reference region. When the background image generation unit 302A determines that there is the pixel with the first attribute value of "0" in the reference region, the process proceeds to step S604. When the background image generation unit 302A determines that there is not the pixel with the first attribute value of "0" in the reference region, the process proceeds to step S602.

In step S602, when the background image generation unit 302A determines that there is not the pixel with the first attribute value of "0" in the reference region, the background image generation unit 302A determines that the first attribute image before the filtering process is adopted to determine the pixel value of the target pixel in the background image 104. In step S603, the background image generation unit 302A determines whether there is the pixel with the first attribute value of "0" in the reference region of the first attribute image before the filtering process. When the background image generation unit 302A determines that there is the pixel with the first attribute value of "0" in the reference region, the process proceeds to step S604. When the background image generation unit 302A determines that there is not the pixel with the first attribute value of "0" in the reference region, the process proceeds to step S605. In step S605, the background image generation unit 302A sets the predetermined initial value to the pixel value of the target pixel in the background image 104.

In step S604, when the foreground image generation unit 301A determines that there is the pixel with the first attribute number of "0" in step S601 or step S603, the foreground image generation unit 301A calculates the evaluation value Ev2 per each pixel with the first attribute value of "0" in the reference region. Then, the foreground image generation unit 301 sets the pixel value of the pixel with the first attribute value of "0" having the largest evaluation value Ev2 as the pixel value of the target pixel in the background image 104.

It should be noted that, in the process in step S604, the background image generation unit 302A determines the pixel in the first attribute image before the filtering process when the process in step S602 is performed. Otherwise, the foreground image generation unit 301A determines the pixel in the filtered first attribute image.

In the second embodiment, in addition to the effects of the first embodiment, it is possible to obtain the following effects.

As described above, in the second embodiment, the image processing apparatus 1A generates the foreground image 103 and the background image 104 using the filtered first attribute image. Accordingly, it is possible to improve the image quality of the composite image (the decoded image) of the MRC image 101 (especially, the image quality of the specific region) as compared with the first embodiment.

Further, in the second embodiment, when the image processing apparatus 1A generates the MRC image 101, it is possible to make the foreground image 103 and the background image 104 more uniform states as compared with the first embodiment. Accordingly, when the image is encoded (compressed) with the JPEG method, it is possible to improve the compression efficiency.

The present invention is not limited to the first and second embodiments described above, and may be modified as follows.

In the first and second embodiments described above, the image processing apparatus 1 or the image processing apparatus 1A is provided with the scanner 2 and the control unit 3 or 3A. The present invention may be applied to an image processing apparatus without the scanner 2 (that is, a configuration including only the control unit 3 or 3A). In this case, it may be configured such that the input image is input externally (for example, inputting through transmission or a recording medium).

Further, in the first and second embodiments described above, the image processing apparatus 1 or the image processing apparatus 1A is configured to output the MRC image 101, and may be configured to simply output the foreground mask image 102, the foreground image 103, and the background image 104 separately. That is, with respect to the foreground mask image 102, the foreground image 103, and the background image 104, the image processing apparatus is configured to output the image with the data format that is not limited to specific one.

Further, the image processing apparatus may be configured to output only one of the foreground image 103 or the background image 104 from the input image. Further, in the image forming apparatus, it is possible to omit the image encoding unit 40, so that the foreground image 103 and the background image 104 are output without encoding.

Further, in the first and second embodiments described above, the image encoding unit 40 encodes the foreground image 103 and the background image 104 with the JPEG method, and the encoding method is not limited to the JPEG method. It should be noted that the image encoding unit 40 encodes with the non-reversible method such as the JPEG method or the reversible method.

The disclosure of Japanese Patent Application No. 2012-214699, filed on Sep. 27, 2012, is incorporated in the application.

While the invention has been explained with reference to the specific embodiments of the invention, the explanation is illustrative and the invention is limited only by the appended claims.

What is claimed is:

1. An image processing apparatus, comprising:
a first attribute image generation unit;
a second attribute image generation unit; and
a foreground image generation unit,
wherein said first attribute image generation unit is configured to determine a first attribute value with regard to each pixel from an input image to generate a first attribute image, said first attribute value being expressed with a first value indicating that a pixel is a specific pixel in a specific region constituting a text or a line, or with a second value indicating that a pixel is not the specific pixel,
said second attribute image generation unit is configured to determine a second attribute value with regard to each pixel from the input image to generate a second attribute image, said second attribute value being expressed with a third value indicating that a pixel is in a chromatic color, or with a fourth value indicating that a pixel is in an achromatic color,
said foreground image generation unit is configured to generate a foreground image expressing color information in the specific region according to the input image, the first attribute image, and the second attribute image, and
said foreground image generation unit is configured to switch a method of determining a pixel value of a target pixel of the foreground image according to contents of the first attribute image and the second attribute image in a reference region including the target pixel associated with determining the pixel value when the pixel value of each pixel of the foreground image is determined.

2. The image processing apparatus according to claim 1, wherein said foreground image generation unit is configured to switch the method of determining the pixel value of the target pixel according to a distribution of the pixels having the first attribute value expressed with the first value and the second attribute value expressed with the third value.

3. The image processing apparatus according to claim 1, wherein said foreground image generation unit is configured to select one of the pixels having the first attribute value expressed with the first value as a reference pixel when there are the pixels having the first attribute value expressed with the first value in the reference region, and
said foreground image generation unit is configured to determine the pixel value of the target pixel of the foreground image according to the pixel value of the reference pixel of the input image.

4. The image processing apparatus according to claim 1, wherein said foreground image generation unit is configured to calculate an evaluation value per each pixel having the first attribute value expressed with the first value in the reference region, and
said foreground image generation unit is configured to determine the pixel having a largest evaluation value as the target pixel.

5. The image processing apparatus according to claim 1, wherein said foreground image generation unit is configured to switch the method of determining the pixel value of the target pixel according to whether the third value is set to the second attribute value of the pixel at a nearest location relative to the target pixel among the pixels having the first attribute value expressed with the first value in the reference region.

6. The image processing apparatus according to claim 1, wherein said foreground image generation unit is configured to calculate a first evaluation value using chromaticness per each evaluation pixel having the second attribute value expressed with the third value among the pixels having the first attribute value expressed with the first value in the reference region, and
said foreground image generation unit is configured to calculate a second evaluation value using brightness per each evaluation pixel having the second attribute value not expressed with the third value among the pixels having the first attribute value expressed with the first value in the reference region.

7. The image processing apparatus according to claim 6, wherein said foreground image generation unit is configured to calculate the first evaluation value and the second evaluation value of the evaluation pixel according to a distance between the evaluation pixel and the target pixel.

8. The image processing apparatus according to claim 1, further comprising a first attribute image processing unit configured to perform a process of removing an edge portion of a specific region from the specific region to generate a processed first attribute image,
wherein said foreground image generation unit is configured to determine the pixel value of each pixel of the foreground image using the processed first attribute image.

9. The image processing apparatus according to claim 1, further comprising a background image generation unit configured to generate a background image expressing color information of a background region other than a specific region.

10. The image processing apparatus according to claim 9, wherein said background image generation unit is configured to generate the background image according to the input image, the first attribute image, and the second attribute image.

11. The image processing apparatus according to claim 9, further comprising an image encoding unit configured to encode the foreground image generated with the foreground image generation unit and the background image generated with the background image generation unit to a reversible code or a non-reversible code.

12. A non-transitory computer readable medium that stores an image processing program that causes a computer to execute functional units including a first attribute image generation unit; a second attribute image generation unit; and a foreground image generation unit,
wherein said first attribute image generation unit is configured to determine a first attribute value with regard to each pixel from an input image to generate a first attribute image, said first attribute value being expressed with a first value indicating that a pixel is a specific pixel in a specific region constituting a text or a line, or with a second value indicating that a pixel is not the specific pixel, said second attribute image generation unit is configured to determine a second attribute value from the input image to generate a second attribute image, said second attribute value being expressed with a first value indicating that a pixel is in a chromatic color, or with a second value indicating that a pixel is in an achromatic color, said foreground image generation unit is configured to generate a foreground image expressing color information in the specific region according to the input image, the first attribute image, and the second attribute image, and said foreground image generation unit is configured to switch a method of determining a pixel value of a target pixel of the foreground image according to contents of the first attribute image and the second attribute image in a reference region including the target pixel associated with determining the pixel value when the pixel value of each pixel of the foreground image is determined.

13. A method of processing an image, comprising:
a first attribute image generation step;
a second attribute image generation step; and
a foreground image generation step, wherein said first attribute image generation step is performed to determine a first attribute value with regard to each pixel from an input image to generate a first attribute image, said first attribute value being expressed with a first value indicating that a pixel is a specific pixel in a specific region constituting a text or a line, or with a second value indicating that a pixel is not the specific pixel, said second attribute image generation step is performed to determine a second attribute value from the input image to generate a second attribute image, said second attribute value being expressed with a first value indicating that a pixel is in a chromatic color, or with a second value indicating that a pixel is in an achromatic color, said foreground image generation step is performed to generate a foreground image expressing color information in the specific region according to the input image, the first attribute image, and the second attribute image, and said foreground image generation unit is configured to switch a method of determining a pixel value of a target pixel of the foreground image according to contents of the first attribute image and the second attribute image in a reference region including the target pixel associated with determining the pixel value when the pixel value of each pixel of the foreground image is determined.

* * * * *